Feb. 23, 1954
F. FREIMANN ET AL
2,670,211
RECORD CHANGER
Filed Jan. 8, 1947
9 Sheets-Sheet 3
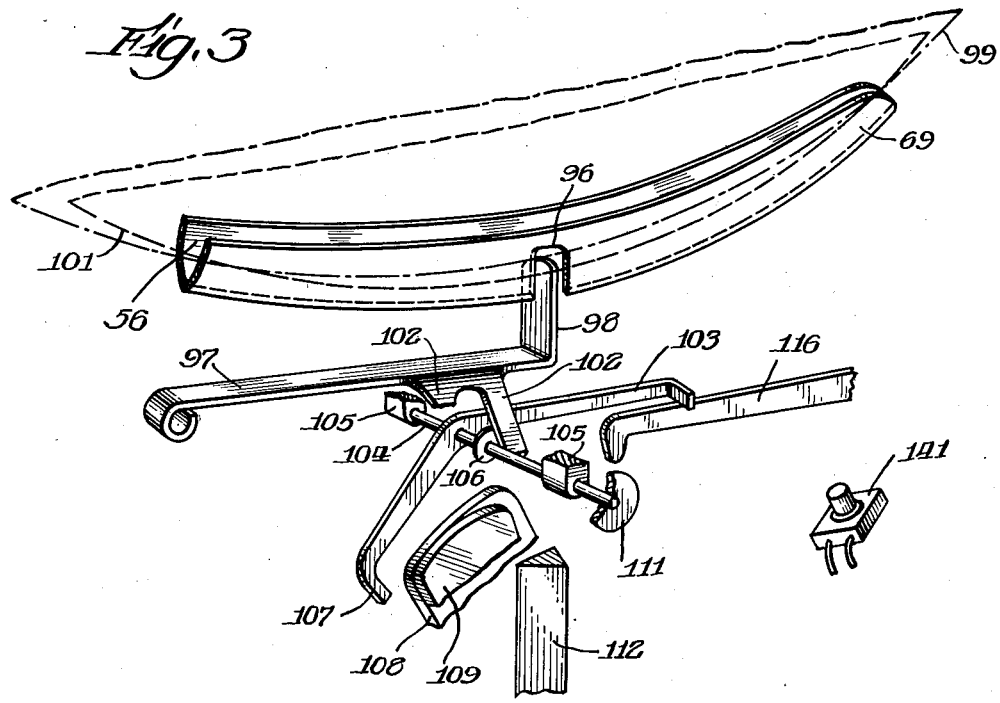
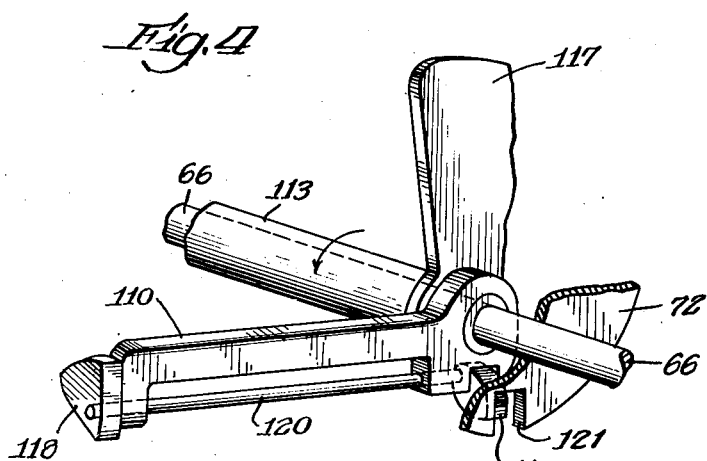
Inventors:
Frank Freimann,
Carl Hart and
Arthur L. Knox, Sr.
By Clarence J. Loftus Atty.

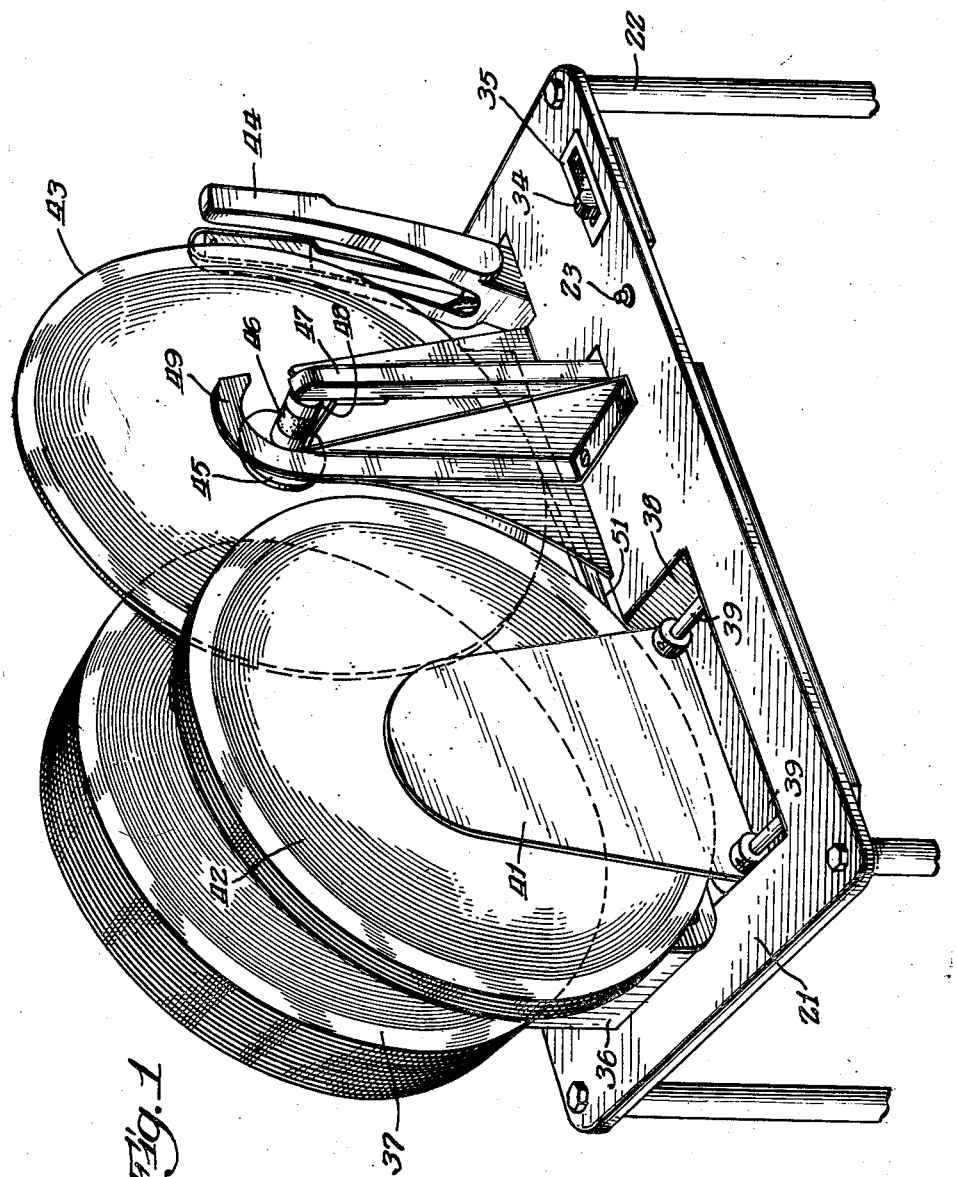

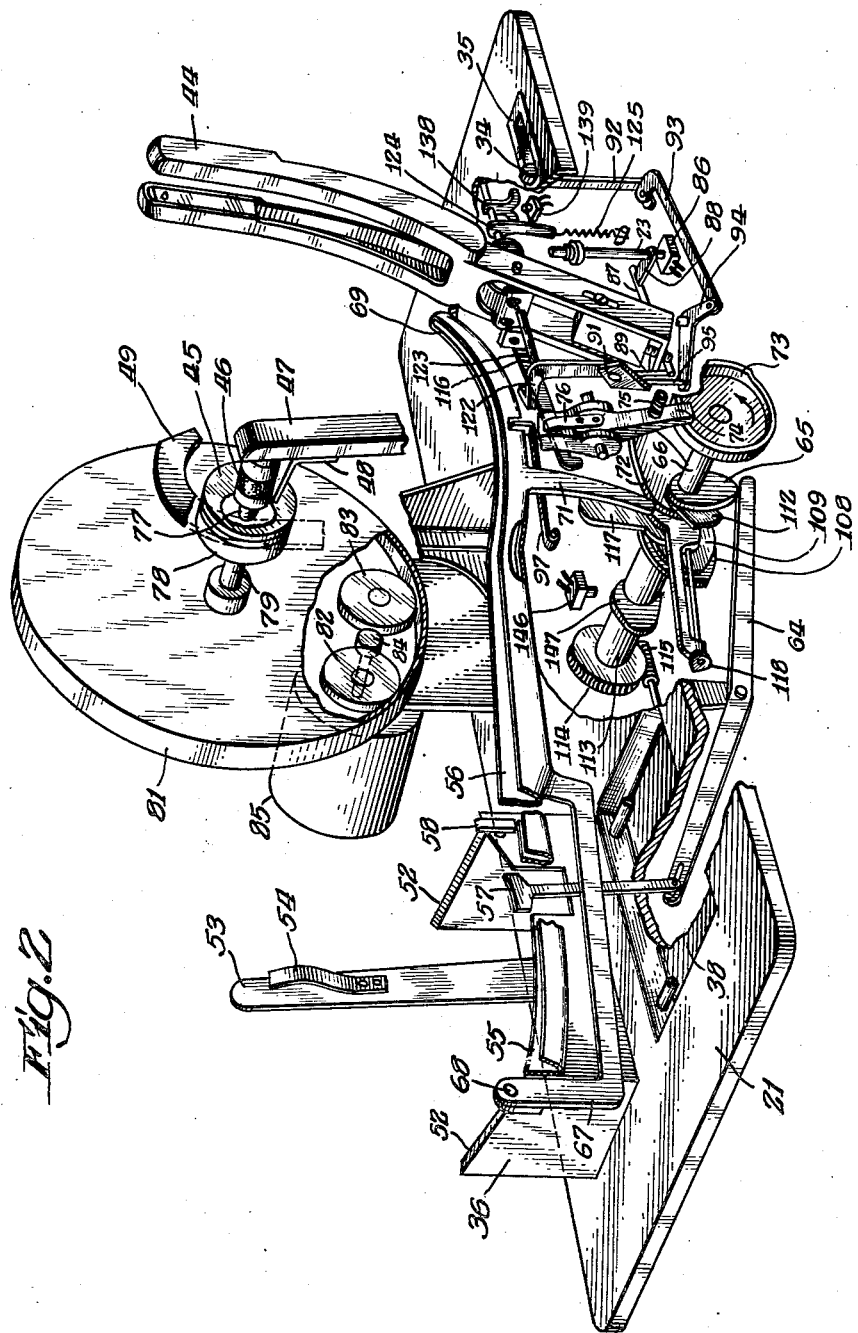

Feb. 23, 1954  F. FREIMANN ET AL  2,670,211
RECORD CHANGER
Filed Jan. 8, 1947  9 Sheets-Sheet 4
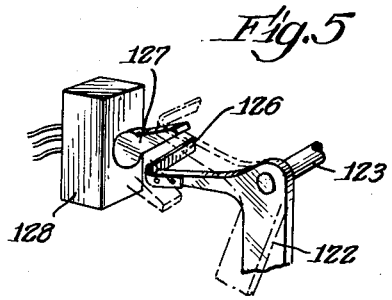
Fig. 5
Fig. 6
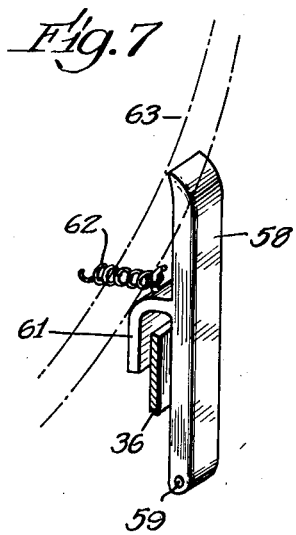
Fig. 7
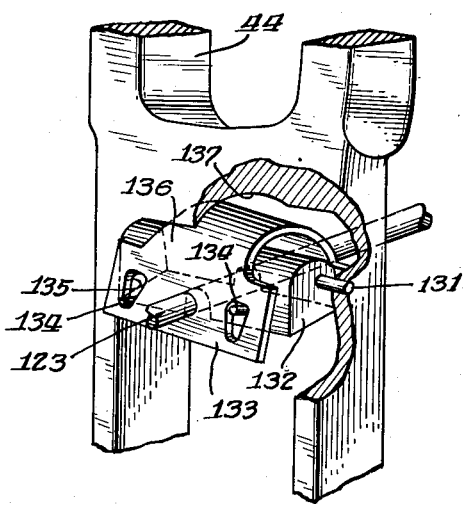
Fig. 8
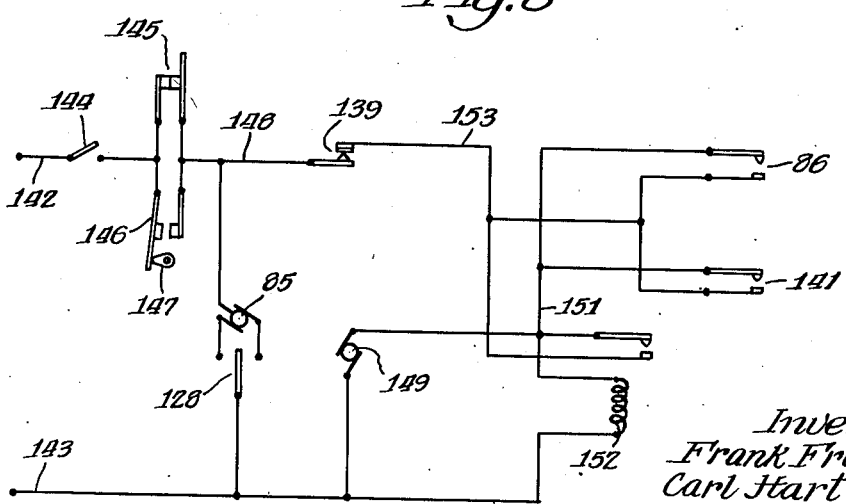
Inventors:
Frank Freimann,
Carl Hart and
By Arthur L. Knox, Sr.
Clarence J. Loftus, Atty.

Inventors:
Frank Freimann,
Carl Hart and
Arthur L. Knox, Sr.
By Clarence J. Loftus atty.

Feb. 23, 1954   F. FREIMANN ET AL   2,670,211
RECORD CHANGER
Filed Jan. 8, 1947   9 Sheets-Sheet 6

Inventors:
Frank Freimann,
Carl Hart, and
Arthur L. Knox, Sr.
By Clarence J. Loftus Atty.

Feb. 23, 1954  F. FREIMANN ET AL  2,670,211
RECORD CHANGER
Filed Jan. 8, 1947  9 Sheets-Sheet 7

Inventors:
Frank Freimann,
Carl Hart and
By Arthur L. Knox, Sr.
Clarence J. Loftus atty.

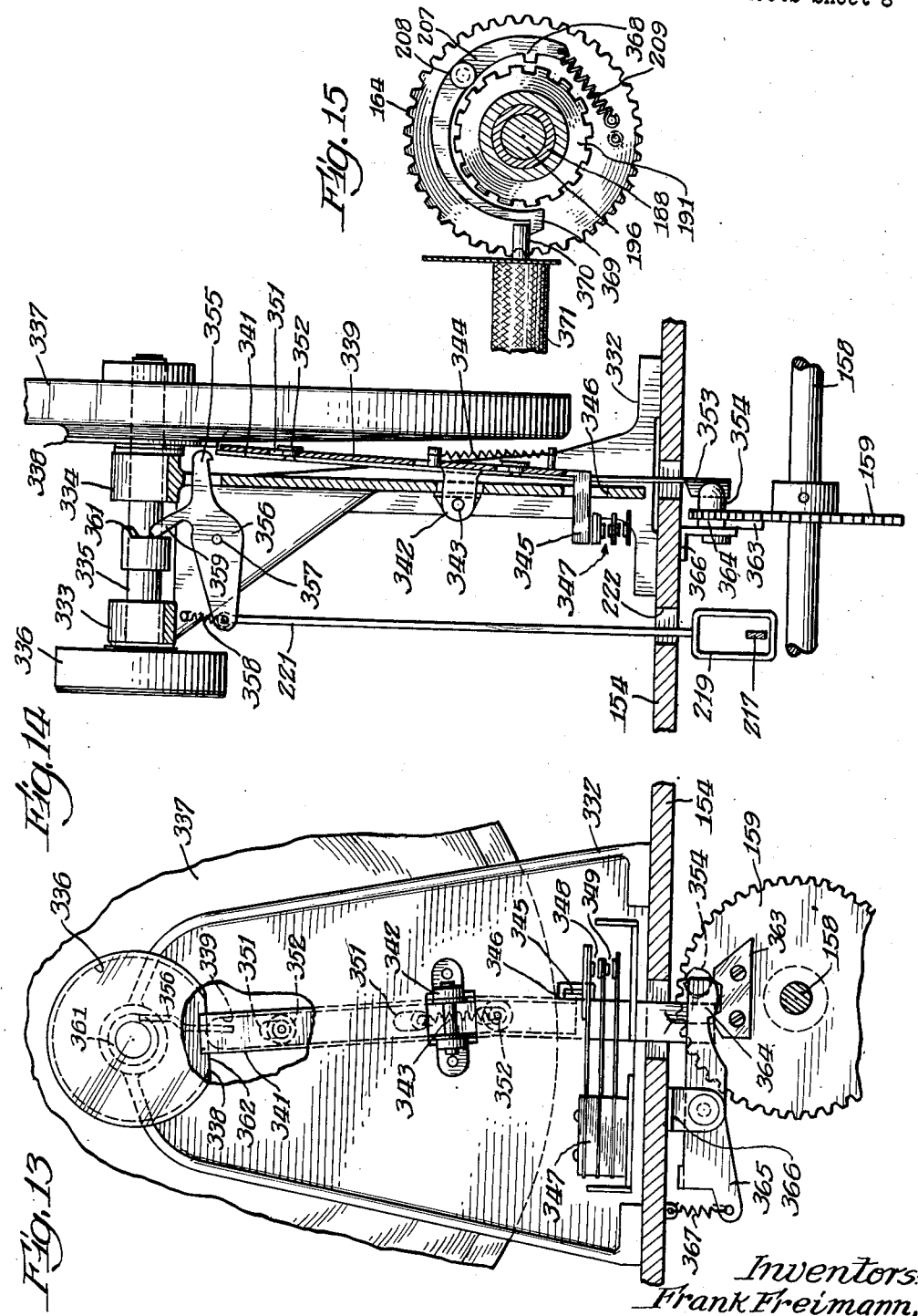

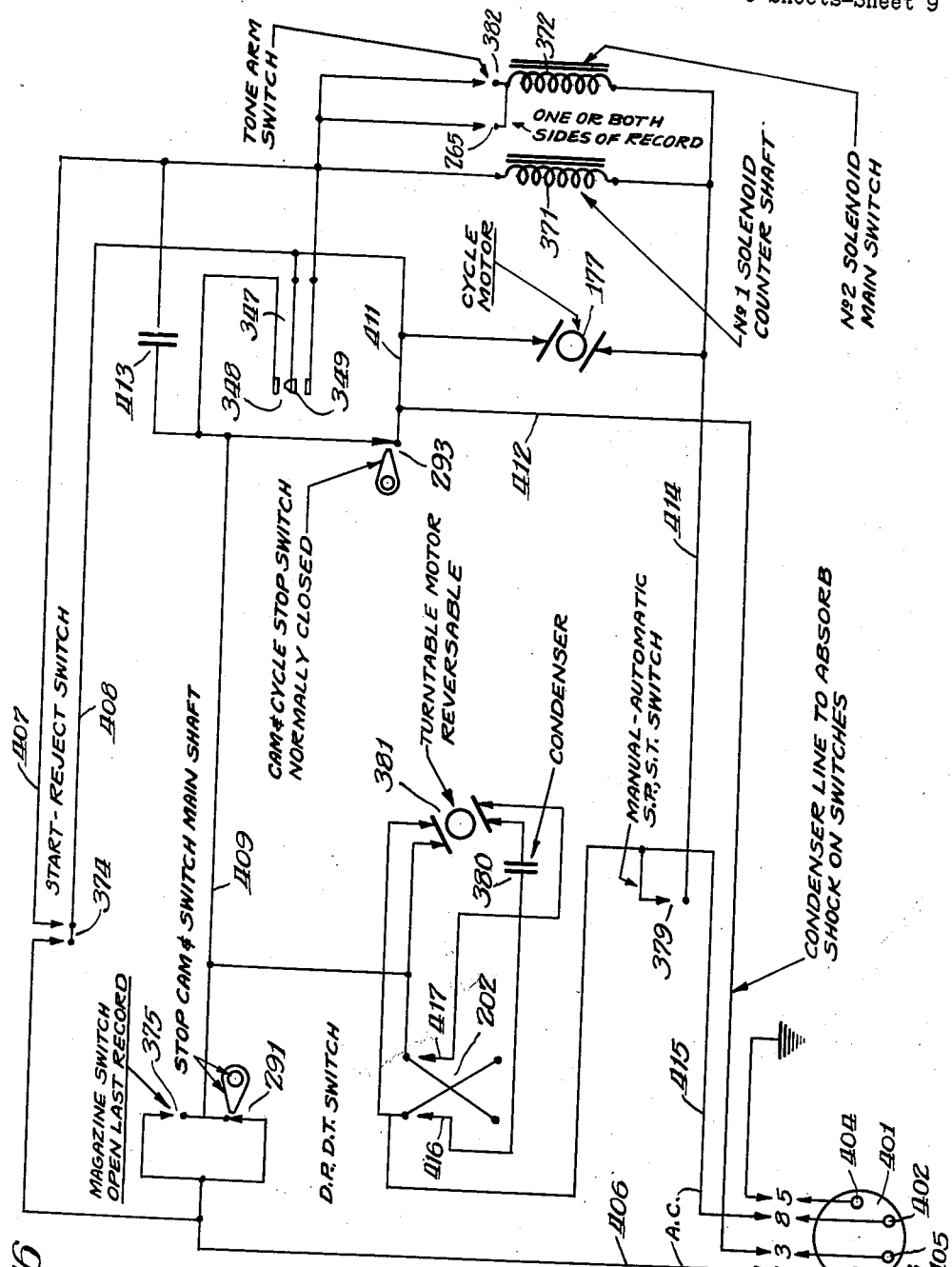

Patented Feb. 23, 1954

2,670,211

UNITED STATES PATENT OFFICE 2,670,211

RECORD CHANGER

Frank Freimann, Carl Hart, and Arthur L. Knox, Sr., Fort Wayne, Ind., assignors to The Magnavox Company, Fort Wayne, Ind., a corporation of Delaware Application January 8, 1947, Serial No. 720,784

9 Claims. (Cl. 274—10)

The present invention relates to phonographs and more particularly to record changers for automatically playing a plurality of records in a desired sequence.

Heretofore home phonographs have employed record changers, but in order to reach a large portion of the public record changers generally have been made of a relatively simple and economical construction and hence have not incorporated certain desirable features. In the relatively high-priced field some record changers have been available which play 10 or 12 inch phonograph records intermixed. In general such changers, however, are arranged to play only one side of each record, thus necessitating changing the stack of records if it is desired to play a symphonic album or the like consisting of a plurality of records. The simpler, more economical phonograph record changers have generally been limited to playing at one time a stack of 10 inch records or a stack of 12 inch records. Such record changers have also had the disadvantages of chipping the edges of the records as successive records are moved to playing position, and also breaking the records due to the strain when the record is dropped into position.

It therefore became apparent that there was need for an improved automatic record changer which would eliminate certain disadvantages of the prior art and in particular the sliding, dropping and resultant wear and breakage of phonograph records. An automatic record changer of this type has been shown, described and claimed in our copending application, Serial No. 631,718, filed November 29, 1945, now U. S. Patent 2,594,633, and which has been assigned to the assignee of the present application.

The record changer described in the aforementioned patent application was provided with a magazine for receiving a plurality of records which were to be played one at a time and then moved to a discard rack. Each record, when moved to playing position, was mounted vertically and record driving means were provided for rotating the record in either of two directions so that a cooperating double tone arm could play either or both sides of the phonograph record. Upon further consideration, it has become apparent that in a record changer of this type certain improvements could be provided. Accordingly, in the present invention certain improvements in the sequence operation mechanism, in the record elevating mechanism, in the pick-up arm support, and certain other elements have been provided.

It is therefore an object of the present invention to provide an improved automatic phonograph record changer arranged to play 10 and 12 inch records intermixed on either or both sides of the records in sequence.

It is a further object of the present invention to provide an automatic record changer having an improved support arrangement for positively positioning the pick-up arm in accordance with the side of the phonograph record to be played.

Still another object of the present invention is to provide in an improved automatic record changer and a magazine rack, a record release mechanism arranged to release one record at a time, irrespective of the relative thicknesses of the records in the magazine.

A further object of the present invention is to provide in an improved automatic record changer a sequence operation mechanism arranged to be selectively controlled in accordance with a selected condition as to whether one or both sides of a phonograph record are to be played.

Still another object of the present invention is to provide in an improved automatic record changer an indexing mechanism responsive to different diameters of records to be played for properly and correspondingly positioning the pick-up arm.

Still another object of the present invention is to provide an improved arrangement for initiating the next operation in a sequence in response to the engagement of the phonograph pick-up or tone arm with the eccentric groove of a phonograph record, irrespective of the type of eccentric groove employed.

A still further object of the present invention is to provide a phonograph record changer of the type having a dual pick-up arm and a reversible record driving mechanism with an anticipating device which insures the stopping and reversal of the record drive before the cycling or sequence operation has progressed materially.

Other and further objects of the present invention subsequently will become apparent by reference to the following description, taken in conjunction with the accompanying drawings wherein:

Figure 1 is a perspective view of a phonograph record changer embodying the present invention as seen from the top of the mounting support;

Fig. 2 is another perspective view similar to Fig. 1 showing various details of the construction by broken away portions;

Fig. 3 is a detail view of the pick-up arm indexing mechanism;

Fig. 4 is a detail view of a clutching arrangement provided on the sequence operations control or cam shaft shown in Fig. 2;

Fig. 5 is a detail view illustrating the switching arrangement actuated in accordance with the movement of the pick-up arm so as to insure proper rotation in the proper direction of the phonograph record with respect to the side of the record to be played;

Fig. 6 shows a means for frictionally braking the pick-up arm during the record changing portion of the sequence operation;

Fig. 7 is a detail view of an element associated with the record magazine for insuring that only a single record is discharged at a time;

Fig. 8 is an electrical circuit diagram for the control of the phonograph illustrated in the preceding figures;

Figs. 13 and 14 are side and end views, respectively, of an arrangement for controlling the cycle of operations when the pick-up arm enters the eccentric groove of a phonograph record;

Fig. 15 is a detail view of the clutch mechanism associated with the element shown in Fig. 12; and Fig. 16 is an electrical circuit diagram of the modified phonograph illustrated in Figs. 9 to 14.

Figure 9:
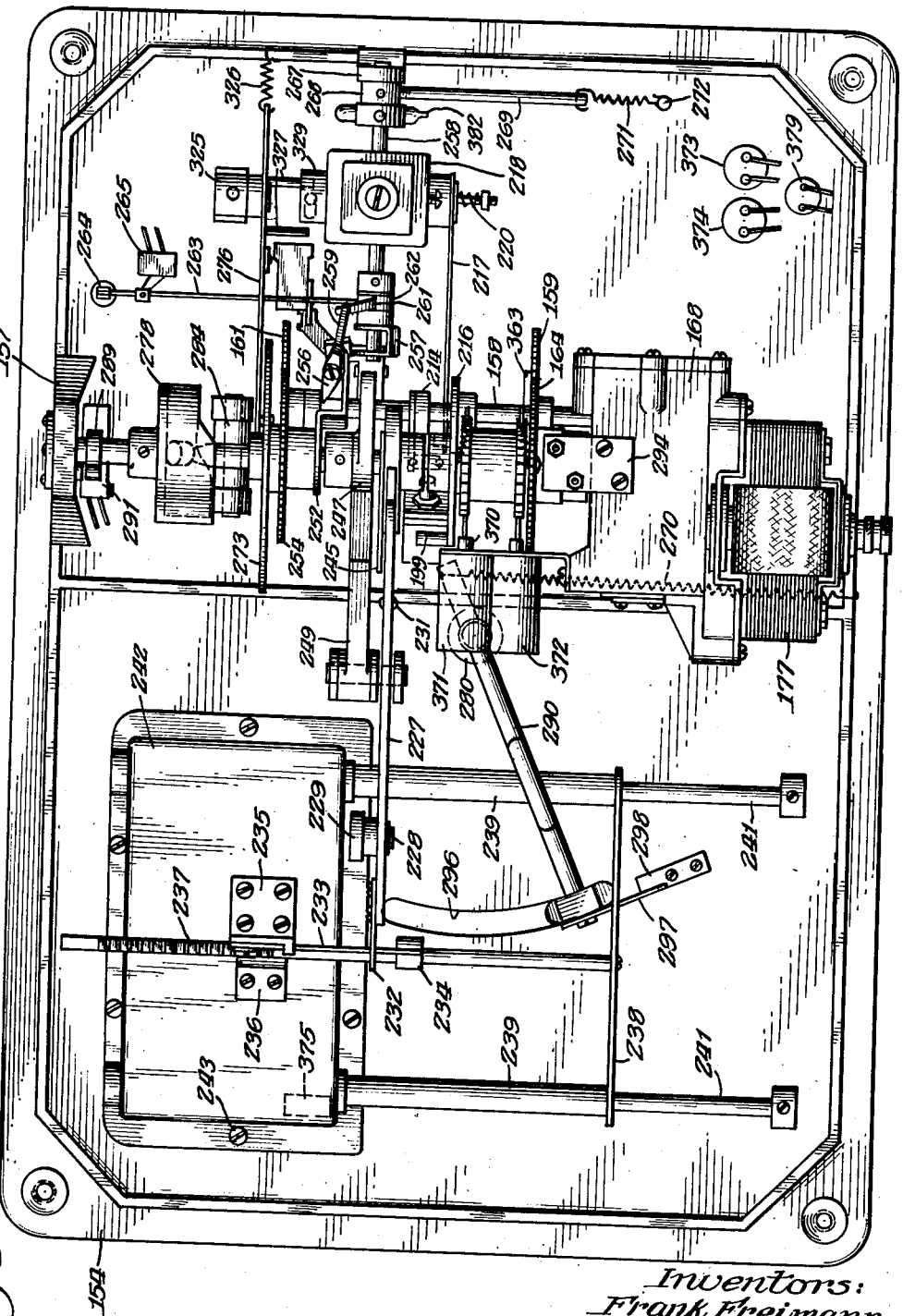
Fig. 9 illustrates another embodiment of the present invention as seen from the bottom.

The general appearance and assembly of the present invention is illustrated in Fig. 1 and includes a mounting support or base plate 21 suitably supported by brackets or legs 22 provided within the housing or cabinet for the phonograph. As is customary, the support legs 22 or brackets provided within the cabinet may carry coil springs or other resilient mountings for the base plate 21. Mounted on the base plate 21 is a pushbutton or starting knob 23 for initiating the operation of the phonograph. Adjacent the starting button 23 there is shown a reciprocable slide button 34 which is movable within an apertured ascutcheon 35 for controlling the operation of the phonograph as to whether each side or only one side of each record is to be played in sequence.

At one end of the base plate 21 there is provided a record magazine 36 which is shown as having therein a plurality of phonograph records 37. Adjacent the magazine 36 the base plate 21 is provided with a recess 38 having therein a plurality of rods 39 which support a generally upright and slightly inclined plate member 41. As will subsequently become apparent, the plate member 41 is movable by definite increments each time that a phonograph record is moved from the turntable to the discharge position. The recess 38 together with the upright support member 41 therefore serves as a discard magazine for the played records 42.

Fig. 1 further shows a phonograph record 43 mounted in position so as to be played as soon as a dual pick-up arm 44 is moved into engagement with one side of the phonograph record 43. The record 43 on one side is engaged by a plate 45 which is mounted on a spindle carried by a resilient member 46. The resilient member 46 is carried by a pivoted upright arm 47 which is provided with a bracket 48 for limiting the movement of the outer portion of the spindle or shaft which carries the record-engaging plate 45. The arm 47 is moved by a suitable mechanism forming a portion of the sequence operation shaft and is spring-biased toward the record 43, which on its opposite side is in engagement with a driving member shown in Fig. 2. When the phonograph record 43 has been played and is about to be discarded, the arm 47 moves outwardly, carrying with it the record 43 until the record engages a stripping arm or bracket 49 which is suitably supported upon the base plate 21. The arm 47 continues to move outwardly until the spindle, supported by the resilient member 46, and the plate 45 is disengaged from the record 43. The record 43 thereupon drops down onto an inclined track 51 which causes the discarded record to roll on down toward the recess 38 and to accumulate as one of the discarded records 42.

Further details of the construction will become apparent by reference to Fig. 2 which is a perspective view similar to Fig. 1 but which has certain portions of the apparatus broken away to illustrate the placement of other cooperating apparatus. The record magazine 36 has inclined upright side edge members 52 which may be beveled inwardly to accommodate the peripheral portions of the phonograph records, such as the stack of records 37 shown in Fig. 1. The rearmost record of such a stack of records is urged forwardly by an upwardly arranged inclined arm or support member 53 which is supported upon an arm journaled beneath the support plate 21 so that the arm 53 extends through an arcuate slot (not shown) and is biased toward the front edge of the record magazine 36. Mounted on the arm 53 is a resilient member 54 which may be of flat spring construction so as to urge forwardly sufficiently the last record in the magazine when that record is about to be moved onto the elevating trough which supplies a new record to the turntable.

The magazine 36 adjacent its front edge is provided with an inclined track or trough 55 which is arranged to cooperate with another inclined trough or track 56 which is a portion of the record elevating mechanism which moves the record into position for engagement by the plate 45 of the arm 47. Adjacent the forward edge of the magazine 36 there is located a record selector member 57 which is adapted to engage the under edge of the outermost record in the magazine so as to raise the record above the forward edge of the magazine. Positioned adjacent the far corner of the forward edge of the magazine 36 is a cooperating selector member 58 which is shown in greater detail in Fig. 7. The member 58 is pivotally mounted at its lower extremity by a suitable connection such as a pin or rod positioned within a transverse aperture 59. The member 58 at an intermediate point is provided with a limiting stop member 61 which extends through a suitable aperture in the forward wall of the magazine 36. The stop member 61 is connected to a suitable spring 62 which biases the catch 58 toward the rear of the magazine 36. The selector 57 moves a record upwardly to the dotted line position 63 so that the pressure exerted by the arm 53 causes the record to move over the top curved surface of the catch 58. The catch 58 is moved rearwardly more rapidly than the movement of the records with the result that the catch 58 insures that only one record may be discharged from the magazine at a time. The selector 57 moves downwardly to permit the record to be discharged into the trough 55. The selector 57 is actuated by a lever 64 having its outer end actuated by a cam 65 which is mounted on the sequence operation shaft 66.

After the record reaches the trough 55 it rolls down an inclined trough 56 which is supported by a pivoted lever 67 having a pivotal connection 68 adjacent one end of the magazine 36. The trough 56 at its other end is provided with a curved portion 69 arranged to slow down the travel of the record when it reaches that portion of the trough or track and to assist in supporting the record when that extremity of the trough 69 is moved upwardly. The rough 56 has a depending cam follower 71 which rides on cam 72 which also is mounted on the sequence operation shaft 66. The shaft 66 carries a cam 73 which engages the lower extremity 74 of the arm 47. The lower extremity 74 of the arm 47 is a separate member which is biased in one direction by a spring 75. The arm 74 carries a leaf spring 76 which engages the arm 47 so as to bias that arm toward the record driving mechanism. The cam 73 at a certain point in the cycle of operation bears against the inside surface of the lever 74 to oppose the action of the spring 75 and thereby cause the arm 47 to move inwardly into engagement with a phonograph record which at the same time has been elevated by the rotation of the shaft 66 and the cam 72.

It may now be assumed that the outer extremity 69 of the trough 56 has been elevated to bring the center of the record in position for engagement by the spindle 77. The spindle 77 passes through the hole in the record so that the plate 45 carried by the spindle engages the record and moves the record against a cooperating plate 78 mounted on a record drive shaft 79. The record drive shaft 79 is carried by suitable supporting means which also supports the turntable flywheel 81. From the broken away portion of the flywheel 81 it is seen that the flywheel 81 is rim driven by either of two drive wheels 82 and 83 which in turn are driven by a drive wheel 84 connected to a reversible phonograph motor 85.

In describing the components thus far referred to in Fig. 2, it has been assumed that certain preliminary operations have taken place such as the actuation of the starting knob 23 and that the knob 34 has also been moved to the desired position. The starting button or knob 23 when actuated closes a normally open circuit switch 86. The actuation of the button 23 also produces rotation of a shaft 87 which carries an arm 88 interposed between the switch 86 and the rod 33. The outer extremity of the rod 87 carries a resilient finger or spring-like member 89 which shifts a cam member 91 so that the phonograph will first play a particular side of the record and thereupon will play the other side of the record if the control button 34 is moved toward the rear of the slot in the escutcheon 35. In Fig. 2 the control button 34 has been moved forwardly so as to cause the phonograph to play only one side of each record in the magazine. The control knob or button 34 is connected to a downwardly extending lever 92 which is connected by a link 93 to a bell crank 94. The bell crank 94 at one extremity carries a resilient finger 95 which is moved into engagement with the cam 91 when the knob 34 is in the position shown in Fig. 2. Thus the cam 91 is always biased toward this position and, as subsequently will become apparent, this position of the cam 91 causes the operation of the phonograph to be such that only one side of each record is played. The arrangement described relative to the action of the resilient fingers 89 and 95 with respect to the cam 91 determines which side of the phonograph record is to be engaged by the dual pick-up arm 44. The arm 44, however, must also be positioned adjacent the periphery of a phonograph record and accordingly must be indexed in accordance with the diameter of the phonograph record.

By referring to Figs. 2 and 3 it will be seen that the outer portion 69 of the trough 56 has as its lowermost edge a recess or opening 96. A lever 97 having an upturned extremity 98 is arranged to have its extremity extend into the recess 96 of the trough portion 69. The dotted line 99 represents the outer diameter of a 12 inch phonograph record which just passes above the top surface of the lever extremity 98 so that the lever 97 is not actuated thereby. The dotted line 101 represents the diameter of a 10 inch record which extends into the trough 69 sufficiently to actuate the lever 97. Extending at an angle from the lever 97 is a pair of fingers 102 arranged to shift a rocker arm 103 mounted on a shaft 104 which is supported from the underside of the mounting plate 21 by a plurality of support brackets 105. The displacement of the lever 97 causes the fingers 102 to shift axially the rocker arm 103, by engagement of a collar 106 so as to align the outer extremity 107 of the rocker arm with a cam 108. When a 12 inch record rests in the trough 69 the lever 97 is not shifted so that the outer extremity 107 of the rocker arm 103 is in alignment with another cam 109. The cams 108 and 109 control the positioning of the pick-up arm 44 in accordance with the different diameter records to be played. In order to reset the rocker arm 103 to its former position after it has been shifted by a 10 inch record, there is provided a collar 111 at the outer extremity of the shaft 104. The collar 111 is arranged to be engaged by a cam 112 which comes into position after the phonograph record has been played. The cam 112 is mounted on the sequence operation shaft 66, and the cams 108 and 109 are mounted on a sleeve 113 which surrounds a portion of the shaft 66. The sleeve 113 is connected to a gear 114 which is engaged by a worm gear 115 driven by a sequence operation motor. The rocker arm 103 engages a cam follower arm 116 which is connected to a pick-up arm 44 and which engages a cam 117 mounted on a sequence operation sleeve 113.

The sequence operation motor which drives the worm gear 115 drives the sleeve 113 so as to rotate the sleeve 113 two revolutions for one revolution of the sequence shaft 66 when both sides of the phonograph record are to be played. In other words, the sleeve 113 drives the shaft 66 intermittently. This is accomplished by an arrangement illustrated in detail in Fig. 4.

Mounted on the end of the sleeve 113 is an arm 110 which supports a rod or shaft 120 having at its outer extremity a cam member 118. At the other extremity of the rod 120 is a latch member 119 which is adapted to cooperate with a recess 121 in the cam 72. It will be remembered that the cam 72 is rigidly mounted on the sequence operation shaft 66. A partial rotation of the rod 120 by the cam 118 produces engagement and disengagement of the latch 119 with the recess 121. The sleeve 113 as seen in Fig. 4 rotates in a counterclockwise manner so as to rotate the arm 110 through an arc so that eventually the cam surface 118 is brought into engagement with the cam 91. The cam 91 is mounted on one extremity of a bell crank 122 which is connected to the dual pick-up arm 44. A bell crank 122 is interconnected with the pick-up arm 44 by means of a rod or shaft 123 which carries at its outer extremity a lever 124 biased in a particular direction by a spring 125. This relationship of the arm 124 and the spring 125 is such as to move the bell crank 122 and its cam 91 to a neutral or central position. The other extremity of the bell crank 122, as may be seen from Fig. 5, carries a resilient or spring finger 126 adapted to engage a toggle lever 127 of a single pole, double throw switch 128. The switch 128 controls the direction of rotation of the phonograph turntable motor 85. While one side of the phonograph record is being played, the arm 122 and the spring 126 are in the dotted line position shown in Fig. 5. When the pick-up arms 44 have been moved beyond the outer periphery of a phonograph record the lever 122 is in the position shown in solid lines. The movement of the lever 122 from the dotted line position to that shown in solid lines moves the toggle lever 127 and switch 128 from the solid position shown, to the dotted line position. In the dotted line position the switch 128 thereupon reverses the direction of rotation of the phonograph motor 85 prior to the time that the sequence operation mechanism has completed its portion of its movement. When the tone arm 44 is positioned for reproducing the opposite side of a phonograph record the rod 123 will move an angular distance equal to the distance between the solid line position and the dotted line position shown in Fig. 5, but in the opposite direction, so that the spring member 126 slides past the toggle 127 of the switch 128 so as to be in position to again actuate the toggle switch when the bell crank 122 is returned to its neutral position as indicated in solid lines in Fig. 5.

Referring to Figs. 2 and 6 it will be seen that the shaft 123 extends on both sides of the tone arm 44. The tone arm 44 is pivotally supported on a pair of bearing pins 131 which are carried by a support member or block 132. The support member or block 132 is rotatably mounted upon the rod 123. The amount of rotation of the block 132 with respect to the rod 123 is limited by a yoke 133 secured to the rod 123. The block 132 carries a pair of pins 134 which extend through suitable apertures 135 in the yoke 133. The apertures 135 upon certain movements of the rod 123 will tilt the tone arm or pick-up 44 in the proper direction, dependent upon which side of a phonograph record is to be played. In the arrangement shown in Fig. 6 the yoke 133 has been moved so as to tilt the tone arm in one direction, thereby freeing the curved top surface 136 from the cooperating curved surface 137 of the pick-up arm 44. When the yoke 133 is in neutral position, such as shown in Fig. 2, the surfaces 136 and 137 are in engagement with each other, thereby serving as contacting or braking surfaces to insure proper orientation of the bifurcated outer extremities of the tone arm 44 when the arm is to be pivotally moved on its pivots 133 into the proximity of the outer groove of a phonograph record dependent upon the movement of the arm 116 which is actuated in accordance with the construction illustrated in Fig. 3.

After the pick-up arm 44 has been moved into position adjacent the outer groove of a phonograph record the cam surfaces 108 and 109 leave the outer extremity of the rocker arm 103 of Fig. 3. At about the time that these cam surfaces leave the outer extremity 107 of the rocker arm 103, the cam 118 of Fig. 4 engages the cam 91 of Fig. 2 so as to actuate the bell crank 122 and thereby rotate the rod 123. The rod 123, as is apparent from Figs. 2 and 6, tilts the outer extremities of the pick-up arm 44 so as to engage the stylus with the phonograph record. When the rod 123 is actuated a bifurcated lever arm 138 shown in Fig. 2 engages an electric switch 139 for producing a controlling operation in an electric circuit which will stop the electric motor which operates the sequence operation sleeve 113.

The pick-up arm 44 traverses the phonograph record until it reaches the eccentric groove, whereupon the arm 116 moves through an arc sufficient to cause it to engage an electric switch 141 shown in Fig. 3. This switch 141 is a normally closed circuit switch which is momentarily interrupted.

An electric circuit diagram is shown in Fig. 8 which shows a pair of electric conductors 142 and 143 adapted to be connected to a suitable source of electric power. One of the conductors 142 is provided with an electric switch 144 which must be closed in order to supply power to the electric circuit of the phonograph. From the switch 144 a conductor is provided which is connected to a normally open circuit magazine switch 145 which is retained in closed circuit relation as long as any phonograph records remain in the magazine 36. The actuating member for the switch 145 is placed closely adjacent the forward edge of the magazine 36 so as to remain closed until the last record has been removed from the magazine. Connected in parallel with the switch 145 is a normally closed circuit switch 146 which, as may be seen from Fig. 2, is adapted to be actuated by a cam 147 mounted on the sequence operation sleeve 113. The cam 147 opens the switch 146 each time that a sequence of operations has been completed and serves to stop the entire mechanism after the last phonograph record has been reproduced. As long as any phonograph records remain in the magazine 36 the switch 145 will render ineffective any opening and closing of the switch 146. The switches 145 and 146 are connected to a conductor 148 which is connected to one side of a switch 139 and to the phonograph record driving motor 85. The record driving motor 85 is of the reversible type having a pair of conductors connected to the reversing switch 128 which was shown in detail in Fig. 5. The switch 128 has one terminal connected to the conductor 143.

A sequence operation motor 149 is provided for driving the gears 114 and 115 and has one terminal connected to the conductor 143. The other terminal of the motor 149 is connected to a conductor 151 which is connected to one terminal of the switches 86, 141 and one of the contacts of a relay 152. The other contacts of the switches 86 and 141 and the relay 152 are connected to a conductor 153. The switch 86 is a normally open circuit switch arranged to be actuated by the starting pushbutton 23 shown in Figs. 1 and 2. The switch 141 is a normally open circuit switch arranged to be actuated by the bifurcated crank or lever arm 138 which is mounted on the rod 123 which supports the tone arm 44.

It may now be assumed that the switch 144 is closed so as to supply power to the circuit shown in Fig. 8. The switch 145 will be closed due to a number of phonograph records being positioned in the magazine 36. The switch 146 will be in open circuit position since that is the position of the switch due to the last operation of the phonograph. By actuating the pushbutton 33 the switch 86 is momentarily closed so as to complete a circuit from the conductor 143 through the winding of the relay 152 to the conductor 151 and through the contacts of the switch 86 to the conductor 153 which in turn is connected by closed contacts of the switch 139 to the conductor 148 which is connected to the magazine switch 145 so that a circuit is completed back to the conductor 142. The solenoid 152 when energized closes its contacts, thereby locking itself into the circuit and completing a power connection to the sequence operation motor 149. The sequence operation motor 149 begins operation so as to remove a record from the magazine 36 and cause it to be positioned upon the record driving means. The cam 118 engages the cam 91 so as to bring about actuation of switch 128 so that the record driving motor 86 operates in the proper direction. At the time that the pick-up arm 44 is moved into engagement with a phonograph record, the bifurcated arm 138 actuates the switch 139 to momentarily open the contacts thereof. The opening of the contacts 139 interrupts the circuit through the relay 152 thereby deenergizing the sequence operation motor 149.

The tone arm or pick-up 44 traverses the phonograph record until the arm 116 reaches the switch 141 and closes the contacts thereof. When the contacts of the switch 141 are closed, the relay 152 is again energized so as to bring the sequence operation motor into action to continue the rotation of the sequence operation sleeve 113 and the shaft 66 provided that the shaft is connected by the clutching arrangement illustrated in Fig. 4.

Where only one side of the phonograph record is to be reproduced, as may be presumed from the relationship of the parts shown in Fig. 2, the cam 118 is rotated by the cam 91 in such direction as to keep the shaft 66 connected in driving relation to the sequence operation sleeve 113. Where both sides of the phonograph record are to be reproduced, the cam 118, upon reaching the cam 191, is actuated so as to disengage the driving connection between the shaft 66 and sleeve 113 so as to permit the sleeve 113 to pass through one revolution before a driving connection is again established between the shaft 66 and the sleeve 113. This relationship between the sleeve 113 and the shaft 66, however, does not change the operation of the electric circuit shown in Fig. 8, since where only one side of the phonograph record is to be played the switch 139 is actuated only once for each phonograph record. The reversing switch 128 remains in the same position since only one side of each phonograph record is to be played.

The operation of the invention thus far described will be more readily understood by assuming a certain operation for the automatic phonograph. It will first be assumed that all of the records contained in the magazine 36 are 12 inch records. The arm 53 is moved rearwardly upon insertion of the records and then is permitted to engage the rearmost record. The resilient spring 54 carried by the arm 53 biases the upper portion of the records toward the forward edge of the magazine since there is a tendency for the records to spread at the top when the magazine is full. As the records are removed, the decrease of the weight against the spring 54 permits the spring to return to normal forward position, thereby to maintain the proper angle of the foremost record in the magazine. It further will be assumed that both sides of each record are to be played and hence the operator checks to see that the pushbutton 34 is moved toward the righthand position as seen in Figs. 1 and 2. Thereafter the operator will close the main electrical switch 144 of the circuit shown in Fig. 8 which may be mounted in any suitable position on the phonograph. Then the starting button 23 is actuated. Actuation of the starting button 23 closes the contacts of the electrical switch 86, thereby to energize the relay 152 and to start the sequence operation motor. At the same time that the switch 86 is closed, the pushbutton or rod 23 moves the lever 88 so as to rotate the rod 87, thus bringing the resilient finger 89 into engagement with the cam 91. The resilient finger 89, upon engaging the cam 91 which is mounted on the bell crank 122, shifts the cam 91 so that the phonograph will start to play the outer side of the phonograph record and subsequently play the opposite side.

A sequence operation control mechanism which includes the shaft 66 and the sleeve 113 which are connected in driving relation to each other rotates all of the cams mounted thereon since provision is made for maintaining the driving connection whenever the previously played phonograph record has been discarded. Therefore the cam 65 engages the extremity of the lever 64 to move upwardly the record selector 57. Preferably the upper edge of the record selector 57 is provided with a resilient friction engaging pad having a construction similar to the construction shown in the aforementioned copending patent application. The selector 57 moves upwardly the foremost record in the magazine 36 to permit the separation and stop mechanism 58 to operate and to insure that only a single phonograph record is to be discharged into the trough or runway 55. The cam 65 continues to rotate to permit the record selector 57 to be lowered so that the record will drop into the trough or groove 55 and run on down the runway 56 until it eventually reaches the curved outer extremity of the runway which has been denoted by the reference character 69.

The periphery of a 12 inch phonograph record, as is apparent from Fig. 3, does not engage the upper extremity 98 of the lever 97 so that the toggle lever 103 is not shifted. The outer extremity 107 of the lever 103 therefore will be engaged by the cam surface 109. Prior to the engagement of the cam surface 109 with the extremity 107 of the lever 103 the cam 72 comes into operation. The cam 72 engages the depending extremity 71 of the trough portion 69 to move upwardly the phonograph record. Both 10 and 12 inch phonograph records are moved upwardly the same amount so that the 12 inch record is actually moved with its center above the pin or spindle 77 of the record driving and engaging apparatus carried by the arm 47. The shaft 66 continues to rotate, thus bringing the cam 73 into position so as to engage and move outwardly the arm 74 which is connected to the record engaging arm 47. Since the pin 77 now is positioned below the aperture in the phonograph record, the spring 76 comes into operation to prevent undue pressure against the record. The trough 69 thereupon permits the record to be lowered until the pin 77 finds the opening in the phonograph record. The arm 47 continues its inward movement toward the phonograph record until the surface 45 is moved toward the surface 78 to clamp the phonograph record therebetween.

After the phonograph record has been mounted in driving relation to the record driving means including the flywheel 81, the sequence operation sleeve 113 continues to move and bring the cam 118 into engagement with the cam 91. Just prior to this movement of the cam 118 into engagement with the cam 91, the cam 117 moves the pick-up arm 44 into the outer periphery of the phonograph record so as to position the stylus in the proximity of the outer groove thereof. With the phonograph pick-up arm 44 thus positioned, the cam 118 engages the cam 91 so as to tilt the pick-up arm, thereby engaging the stylus with the outer groove of the record. Since both sides of the phonograph record are to be played, the cam 118 is actuated so as to disengage the driving connection formed by the notch 121 and the latch 119 shown in Fig. 4. The tilting of the phonograph pick-up arm 44 against the phonograph record brought about momentary actuation of the switch 139, thus interrupting the circuit through the relay 152 and thereby deenergizing the sequence operation motor 149. The initial actuation of the cam 91 and the lever 122 also brought about proper actuation of the switch 128. The phonograph record therefore is rotated until the pick-up arm 44 reaches the inner concentric groove.

When the inner concentric groove is reached the lever 116 actuates the switch 141 which again completes a circuit through the solenoid 152 thereby to bring into operation the sequence operation motor 149. The motor 149 now drives the sleeve 113 while the shaft 66 remains stationary, since the cam surfaces on the shaft 66 control the engagement and disengagement of the phonograph record with the driving spindle. The sleeve 113 rotates the cam 117 so as to engage the outer extremity of the arm 116, thereby to move outwardly the tone arms 44. When the cam 117 engages the outer extremity of the arm 116, the spring 125 rotates the shaft 123 so as to position both portions of the bifurcated pick-up arm 44 in a neutral position free from contact with either side of the phonograph record. The cam 117 moves the tone arm completely out beyond the outer periphery of the phonograph record.

The indexing mechanism shown in Fig. 3 has not been changed and hence subsequent operation of the arm 116 will again be in accordance with the 12 inch diameter of the phonograph record. The cam surfaces 108 and 109 move into position so that the cam surface 109 moves inwardly the tone arms 44 to the outer groove of the phonograph record. When this action has been completed the cam 118 again engages the cam surface 91. The cam 91 is pivotally mounted on the bell crank lever 122 so that the cam is shifted each time it is engaged by the cam 118 unless the cam is biased in one direction by either of the resilient fingers 89 or 95. The resilient finger 89 merely biases the cam 91 initially, whereas the finger 95 continually biases the cam 91. It was, however, assumed in the description of this operation that the finger 95 was moved away from the cam 91.

As the cam 118 continues down one side of the cam 91, the cam is eventually tilted in a direction opposite to that shown in Fig. 2. By a suitable means not illustrated in this figure, the cam 91 is limited in motion an equal amount on either side of a center line passing down one portion of the bell crank arm 122. The cam 91 is shifted so that the next time the cam 118 engages this cam it does so on the opposite cam surfaces thereof. This form of cam operation on the part of the cam 91 is similar to the form of cam operation provided in the construction shown and claimed in the aforementioned copending patent application.

The operation of the cam 118 against the cam 91 shifted the tone arm 44 so as to cause it to play the opposite side of the phonograph record. The shifting of the bell crank 122 which carries the cam 91 also brought about actuation of the switch 128 so that the direction of rotation of the turntable 81 and the record driven thereby had been initiated just prior to the time that the stylus of the pick-up arm 44 was placed in engagement with the second side of the record to be reproduced. At the time that the tone arm 44 is placed in engagement with the second side of the phonograph record, the switch 139 is actuated by the bifurcated arm 138 so as to interrupt the circuit through the solenoid and deenergize the sequence operation motor 149.

Upon completion of the reproduction of the phonograph record, the arm 116 again actuates switch 141 to again cause the relay 152 to be closed and locked into circuit so as to energize the sequence operation motor 149. The sequence operation sleeve 113 therefore operates in the same manner previously described, but when the cam 118 was last actuated the latch 119 was placed into engagement with the notch 121 in the cam 72 so as to cause the shaft 66 now to be driven with the sleeve 113. Consequently, after the tone arm 44 is again moved outwardly to clear the record, the cam surface 73 moves so as to permit the spring 75 to move the arm 47 outwardly away from the turntable flywheel 81. The phonograph record continues to rest on the pin or spindle 77 until the record is engaged by the record removing arm or bracket 49. The arm 47 continues to move outwardly until the pin 77 has been completely withdrawn from the central hole in the phonograph record, whereupon the record drops into the return or discard trough 51 and rolls into the recess 38.

A suitable mechanism, not shown in the figures thus far described but which is similar to a mechanism subsequently to be described, is employed to move the record supporting member 41 on the rods 39 an equal increment each time that a phonograph record is discharged from the record driving mechanism. At this point in the cycle of operation the cam 147 on the sleeve 113 again actuates switch 146 and if no further records remain in the magazine 36 the circuit shown in Fig. 8 is deenergized. If, however, records still remain in the magazine the switch 145 holds the circuit energized so that a successive cycle of operation is repeated, and this continues until each and every record in the magazine 36 has been played on both sides.

If it is assumed that the magazine contains 12 inch records and it is desired to play one side of each record, the knob 34 is moved forwardly to the position shown in Figs. 1 and 2. The movement of the knob 34 forwardly to the position shown in these figures causes the resilient finger 95 to be placed in engagement with the cam surface 91, thus biasing it to a predetermined position. The cam surface 118 in passing over the cam surface 91 will not be effective to move this cam surface to a new position as is the case where both sides of a phonograph record are to be played. As a result of this action the cam 118 is engaged only on the one side so that the latch 119 is retained in position in the notch 121 of the cam 72. Thus for single side record reproduction the shaft 66 is continually maintained in driving relation with the sleeve 113 and hence as soon as one side of the phonograph record has been reproduced the cam 73 moves the arm 47 outwardly to cause the record to be dropped into the trough 51 and moved to the discard rack. All other operations previously described in connection with the reproduction of the 12 inch record are generally the same. Since the cam 91 is engaged on only one side, the shaft 123 of the bell crank 122 does not operate to reverse the toggle 127 of the reversible switch 128 and consequently the reversible phonograph motor 85 continues to run in the same direction.

It will now be assumed that 10 inch records have been placed in the magazine 36. The various operations heretofore described in connection with the 12 inch record are similarly reproduced for the playing of a 10 inch record, with the exception of the indexing of the tone arm or pick-up arm 44. When a 10 inch record is moved to the trough 55 it rolls down the trough into the trough 56 and comes to rest in the trough portion 69. The lower portion of the periphery of the record thereupon engages the extremity 98 of the lever 97. The downward motion of the lever 97 causes the bifurcated portions 102 to engage the collar 106 on the shaft or rod 104. This shifts the rod 104 toward the rear as seen in Fig. 3, thereby moving the lever 103 so that the outer extremity 107 will be engaged by the cam surface 108 instead of the cam surface 109. The cam surface 108 serves to actuate the lever 103 to a greater degree, thereby moving the pick-up arm 44 farther in toward the center of the phonograph record driving mechanism. Thus the pick-up arm 44 is again moved to the outer groove of a 10 inch phonograph record. The elevating mechanism consisting of the cam 72 acting upon the depending portion 71 of the trough 69 is so arranged that the central hole of a 10 inch phonograph record is moved up to or slightly above the center line passing through the spindle 77 which is carried by the arm 47.

If both sides of the phonograph record are to be played, the sequence operation sleeve 113 will make two revolutions to one revolution of the shaft 66. The shaft 66 carries the cam 112 which for each revolution of the shaft 66 comes into engagement with the collar 112 mounted on the shaft or rod 104. The cam 112 reciprocates the rod 104 to again restore the lever 103 to the 12 inch record indexing position so that the outer extremity 107 is in alignment with the cam surface 109. This operation is performed each time that a 10 inch phonograph record has been reproduced.

From the foregoing descriptions of the operation of the phonograph with respect to 12 inch phonograph records and 10 inch phonograph records it will readily become apparent to those skilled in the art that 10 and 12 inch phonograph records may be intermixed and placed in the magazine 36. The record selector 57 is so constructed and cooperates with the member 58 that a single record only is released from the magazine irrespective of differences in the thicknesses or the diameters of the phonograph records stored therein. The clamping means for holding the phonograph record in driving relation with respect to the driving shaft 79 and its flywheel 81 is so arranged as to clamp securely in position each phonograph record, irrespective of variations in the thickness thereof. The resilient support connection 46 compensates for any deviation in axial alignment of the centering pin or spindle 77 relative to the driving shaft 79. The support bracket 48 underneath the resilient member 46 limits the movement of the spindle 77 so that it will always be in approximately the correct position for engaging the hole in the phonograph record. The resilient connections to the arm 47 which include the springs 75 and 76 insure proper pressure between the members 45 and 78 irrespective of variations in the thicknesses of the different records.

Where 10 and 12 inch records are intermixed and placed in the magazine 36 a 12 inch record will not actuate the indexing mechanism shown in Fig. 3 and the operation will correspond to the previous operation heretofore described. Upon the completion of the reproduction of a 12 inch phonograph record, the cam 112 still comes into position to attempt to move the shaft 104 of Fig. 3 to its original position, but since the indexing mechanism has not moved the shaft 104 previously, the cam 112 does not reciprocate the shaft 104. When the 12 inch record is followed by a 10 inch record, the indexing mechanism shown in Fig. 3 is actuated and the operation of the mechanism thus far described is in accordance with the description given in connection with 10 inch phonograph records. From this it will furthermore be understood that it is possible to play different diameter records intermixed and to preselect the operation of the phonograph so as to play either one side of each record or both sides of all of the records that have been placed in the magazine 36. When the last phonograph record has been reproduced, the phonograph mechanism is stopped.

Thus far it has been assumed that a stack of phonograph records is placed in a magazine 36 so that a plurality of records is to be played. The phonograph furthermore may be operated so as to play individual records, one at a time, thus to correspond to what is known by the trade as manual operation of the automatic phonograph. A single record may be placed in the record magazine 36 for playing on either one side or both sides of a record, dependent upon the predetermination as controlled by the position of the knob 34. Having determined whether one side or both sides of the record are to be played, the pushbutton 23 is actuated. Since only a single record was placed in the magazine, the switch 145 was opened as soon as the record was released by the selector 57. Thus as soon as one or both sides of the record have been reproduced as predetermined by the button 34, the mechanism of the phonograph will be stopped at the conclusion of a single cycle of operation.

If desired, the individual record may be placed directly in the trough 55 and permitted to roll down the trough 56 to the curved portion 69. With the phonograph record in this position the starting button 23 may be actuated so as to cause the mechanism to operate to elevate the phonograph record into position, and the mechanism will pass through a cycle of operation similar to that previously described.

Figure 10:
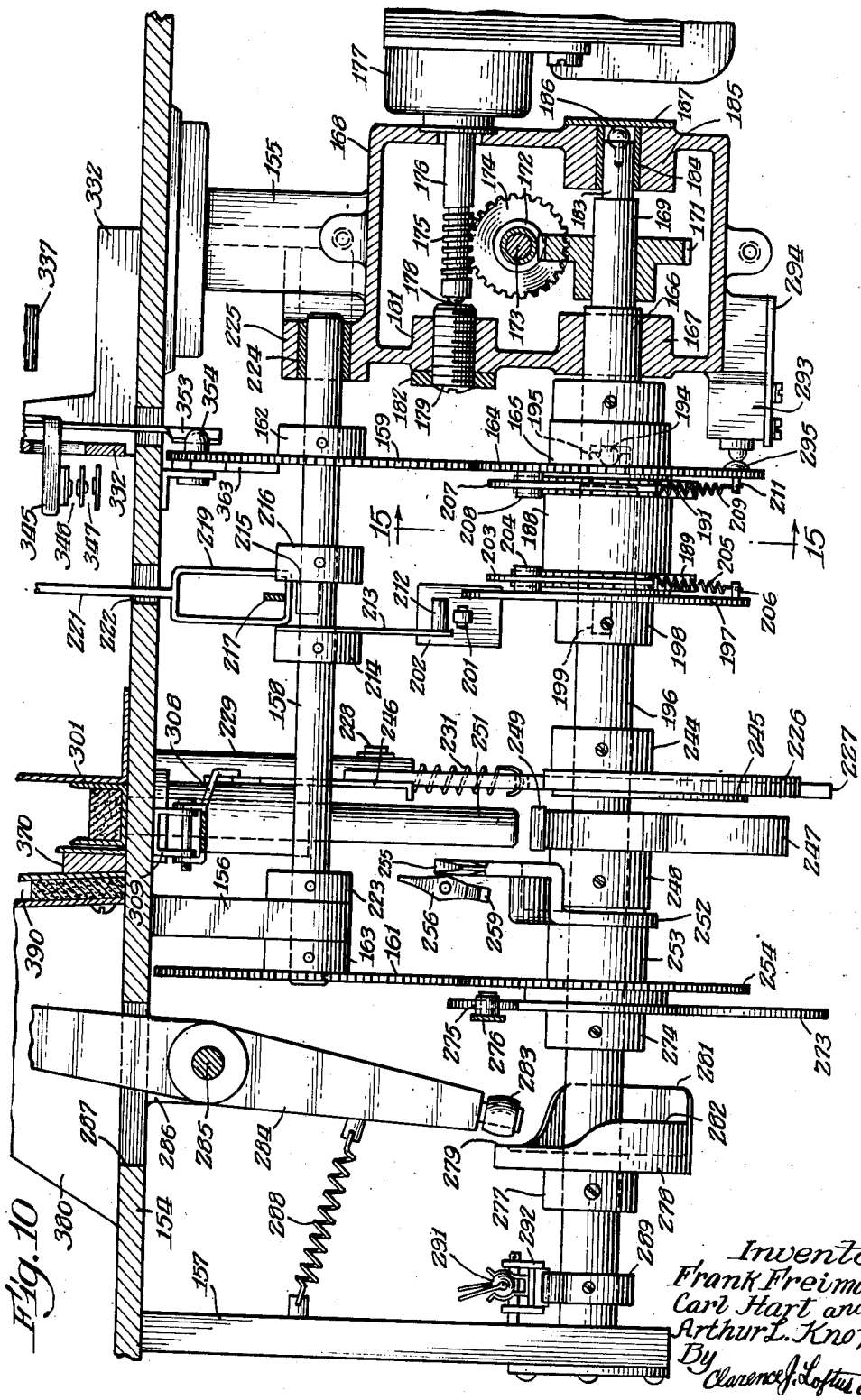
Fig. 10 is a view underneath the mounting plate of the embodiment of Fig. 9 showing particularly the sequence operation shafts.

Another embodiment of the present invention having an upper appearance similar to that shown in Fig. 1 is illustrated in Figs. 9 and 10.

In these figures there is shown a mounting base 154 which is similar to the mounting base 21 of Figs. 1 and 2. The base 154 has a plurality of depending supports 155, 156 and 157. Mounted between the supports 155 and 156 is a shaft 158 carrying a plurality of gears 159 and 161 secured to the shaft by collars 162 and 163 respectively. The gear 159 meshes with a gear 164 which is carried by a sleeve or free collar 165 mounted on a shaft 166. One portion of the shaft 166 passes through a boss or bearing portion 167 of a gear housing 168 which is secured to the support 155. The shaft 166 has a reduced diameter portion 169 which is provided with a gear 171 which meshes with a gear 172 mounted on a shaft 173. The shaft 173 is suitably journaled in the gear housing 168 and carries another gear 174. The gear 174 engages a worm gear 175 formed on a portion of the shaft 176 which is the shaft of a sequence operation motor 177.

The end of the shaft 176 is provided with a thrust ball bearing 178 which is engaged by an adjustable stop bearing 179 which passes through a boss 181 in the gear housing 168, and which is retained in position by a lock nut 182. The shaft 166 to the right of the reduced diameter portion 169 as seen in Fig. 10 has a further reduced diameter portion 183 which engages a bearing member 184 contained in a suitable boss 185 in the gear housing 168. The end of the reduced diameter portion 183 of the shaft 166 is engaged by a thrust ball bearing 186 which is in engagement with an end plate 187.

Figure 12:
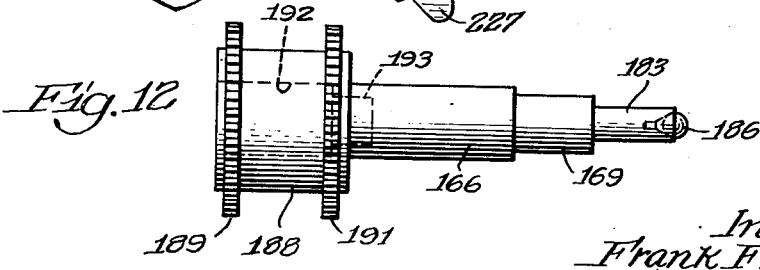
Fig. 12 is a detail view of one element of the sequence operation shaft as seen in Fig. 10.

Further details of the shaft 166 are more clearly shown in Fig. 12, from which it will be seen that the shaft 166 has an enlarged portion 188 which carries two ratchet wheels 189 and 191. The enlarged shaft portion 188 has a recess 192 which communicates with a smaller recess 193 which extends into the main shaft portion 166. As may be seen from Fig. 10, the shaft 166 carries in the recess 193 a thrust ball bearing 194 which engages a reduced diameter end portion 195 of a shaft 196 which has its other extremity supported by the depending support 157. The shaft 196 carries a disk 197 which is mounted on a collar 198 secured to the shaft 196. The disk 197 carries a pin 199 which is adapted to engage a toggle 201 of an electric switch 202. The disk 197 further carries a dog lever 203 pivotally supported at an intermediate point by a pivot bearing 204. The dog lever 203 is connected at one end to a spring 205 which is connected to a pin 206 on the disk 197 so that the latch 203 is biased into engagement with the square toothed clutch wheel 189 of the enlarged portion 188 of the shaft 166.

The gear 164 carries a dog lever 207 pivotally supported at 208 and biased by a spring 209 secured to a pin 211. The dog lever 207 is similar to the dog lever 203 of the disk 197 and is biased toward engagement with the square toothed clutch wheel 191 of the shaft 166.

The switch 202 is arranged to have its toggle 201 actuated in the opposite direction from that actuated by the pin 199 of the disk 197 by a pin 212 carried by a lever 213 which is secured by a collar 214 to the shaft 158. The shaft 158 also carries a lever 215 mounted on a collar 216 which is secured to the shaft 158. The lever 215 is arranged to engage a lever 217 which is frictionally secured to the side of a pick-up arm 218 shown in Fig. 11. The outer extremity of the lever 217 passes through a loop 219 which is carried on the extremity of a wire or rod 221 passing through an aperture 222 in the support or base mounting plate 154. The function of these elements will subsequently be described in connection with the detailed description of the structure illustrated in Figs. 13 and 14.

The shaft 158 is secured in position by a stop collar 223 mounted adjacent the depending support 156. The other extremity of the shaft 158 passes through a bearing 224 carried by an upstanding projection or boss 225 formed as a portion of the depending support 155 and the gear case 168. The shaft 158 therefore is arranged to rotate whenever the motor 177 is operating and the latch 207 is in its normal ratchet engaging position.

The shaft 196 is arranged to be driven with the shaft 166 dependent upon whether or not the latch 203 of the disk 197 is in the normal ratchet engaging position. The shaft 196 carries a plurality of sequence operation cams, including a cam 226 which is arranged to engage a lever 227 pivotally supported at 228 from a depending support 229. The lever 227 is biased against the cam 226 by a spring 231.

As may be seen from Fig. 9, the lever 227 carries an extension member 232 which engages a lever 233 having at its outer extremity a counterbalance or weight 234. The lever 233 is pivotally supported from a supporting bracket and structure 235 which, together with another bracket 236, serves as a guide for a rack 237. The extremity of the lever 233 acts as a pawl against the rack 237 to move the rack one notch each time that the lever 227 is actuated. The rack 237 is connected at one extremity to a cross member 238 which is connected to a pair of sleeves 239 mounted upon rods 241. The sleeves 239 extend into a well or recess formed by a casing 242 suitably secured to the underside of the support plate 154 by screws 243. The chamber or recess formed by the casing 242 corresponds to the recess 38 shown in Fig. 1. The extremities of the sleeves 239 carry a record supporting member similar to the member 41 of Fig. 1.

The cam 226 is secured to the shaft 196 by a collar 244 which also carries a relatively thin cam 245. The cam 245 is adapted to engage a depending lever 246 which is associated with a structure subsequently to be described in connection with Fig. 11. Just beyond the cam 245 there is located another cam 247 which is carried by a collar 248. The cam 247 is arranged to engage a pivoted lever 249 which in turn strikes a reciprocable rod 251. The lever 249 and the rod 251 are also shown in detail in Fig. 11.

Just beyond the collar 248 of the cam 247 is located a cam 252 carried by a sleeve 253 which is secured to a gear 254. The gear 254 meshes with the gear 161 of the shaft 158. The cam 252 has a beveled outer extremity 255 which is arranged to engage a pivoted cam 256 which is carried on the extremity of a lever 257 mounted on a shaft 258 which passes through certain structures associated with the pick-up arm 218. The shaft 258 corresponds to the shaft 123 of the pick-up arm illustrated in detail in Fig. 6. The cam 256 carries a projecting portion 259 which is selectively engageable with a resilient member or spring finger 261 carried by a collar 262 rotatably mounted upon the shaft 258. The collar 262 is arranged to be actuated by a rod 263 which at its outer extremity is connected to a lever 264 which passes up through a suitable opening in the support plate 154. The lever 264 is actuated in the direction shown in Fig. 9 in order to bias the cam 256 to one position so as to cause the phonograph to play only one side of each record. The rod 263 is arranged to actuate a toggle switch 265 for controlling a solenoid. The rod 258 is carried by a support 266 shown in Fig. 11 and another support 267 shown in Fig. 9. Adjacent the support 267 the rod 258 is connected to a collar 268 which carries a lever 269 connected to a spring 271 which is anchored to a suitable stud 272 on the bottom of the support plate 154. The spring 271 acting on the lever 269 is arranged to bias the shaft 258 to a neutral position.

Just beyond the gear 254 which is mounted on the shaft 196 by the sleeve 253 there is located a cam 273 secured in position by a collar 274. The cam 273 is engaged by a cam follower roller 275 carried at the outer extremity of a pivoted control member 276. The purpose of the cam 273 together with the cam follower 275 will further be explained in the description of the apparatus shown in Fig. 11.

The shaft 196 also carries a collar 277 which is secured to a cam 278. The cam 278 has a dwell portion 279, a high portion 281 and an intermediate portion 82. The cam portions 281 and 282 are arranged to be engaged by a cam follower roller 283 mounted at the lower extremity of a clamping lever or arm 284 which is pivotally supported at 285 from a depending support 286. The lever 284 extends upwardly through an aperture 287 in the support plate 154. The upper extremity of the clamping lever 284 is similar to the upper extremity of the record supporting and clamping arm 47 shown in Figs. 1 and 2. The arm 284 is biased toward the cooperating record driving mechanism, such as shown in Fig. 1, by a spring 288 secured to an intermediate point on the lower portion of the arm 284 and to a suitable point on the depending support 157.

The shaft 196 carries a cam 289 which is arranged to actuate an electric switch 291 carried on a pivoted lever cradle arrangement 292. The pivoted cradle and lever arrangement 292 is supported from the depending support 157. The switch 291, as subsequently will become apparent, is arranged to interrupt a circuit which will stop the operation of the phonograph after the last phonograph record has been reproduced. Another electric switch 293 is mounted on a plate 294 secured to the gear housing 168. The switch 293 is a normally closed circuit switch which is moved to open circuit position by a projection or cam member 295 mounted on one side of the gear 164.

Fig. 9 further discloses that the support plate 154 is provided with an arcuate slot 296 through which is passed the upright portion of a pivotally mounted lever 290. The upright portion of the lever 290 is similar to the record engaging lever 53 which carries the spring 54 as shown in Fig. 2. The lever 290 is pivotally supported from a support stud 280 depending from the underside of the base plate 154. The lever 290 is biased into record engaging relation with respect to the records in the record magazine by a spring 270. In order to facilitate loading the magazine the arm 290 is arranged to be latched in the position shown in Fig. 9 by a suitable latch and catch arrangement which includes a reciprocable lever 297 arranged to engage a cooperating catch 298 which is mounted on the underside of the plate 154. After the records have been stacked in the magazine, the lever 297 is actuated so as to permit the spring 270 to move the arm 290 until the stack of records is engaged.

Figure 11:
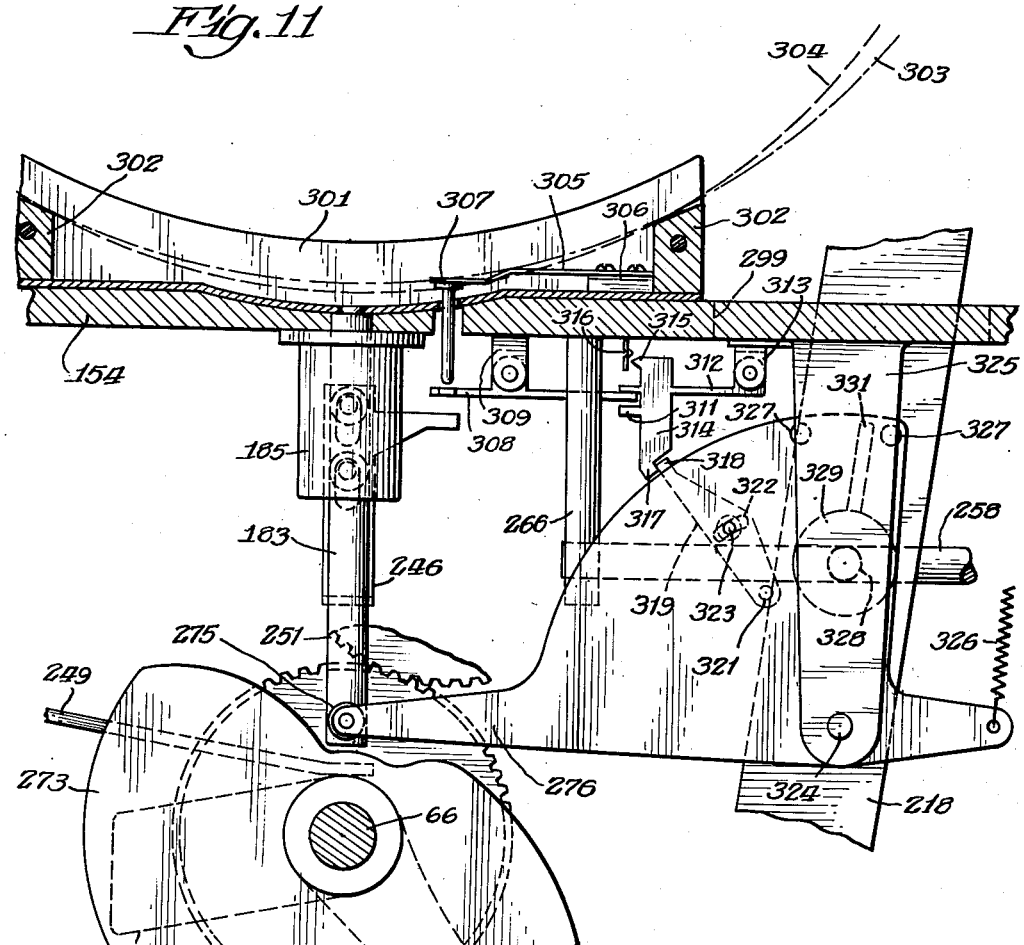
Fig. 11 is an end view of the sequence operation shaft showing certain cams thereon, and the parts of the phonograph controlled thereby.

Reference may now be had to Fig. 11 which illustrates a portion of the apparatus controlled by the sequence operation mechanism illustrated in Figs. 9 and 10. A pick-up arm 218 corresponding to the tone arm structure shown in Fig. 6 is supported by a rod 258 which engages a supporting member, not shown, which corresponds to the member 132 of Fig. 6. The pick-up arm extends upwardly through the base 154 through an aperture 299. In order to index the position of the arm 218 with respect to phonograph records of different diameters there is provided a certain structure in the record elevating mechanism which is responsive to a smaller diameter record. The rod 251 carries a record elevating trough 301 which is provided with spaced apart record supporting membes 302. The dotted line 303 represents the position taken by a 12 inch phonograph record, and the dotted line 304 represents the position taken by a 10 inch phonograph record. The 10 inch phonograph record will engage a resilient lever 305 mounted upon a support plate 306. The extremity of the resilient lever 305 engages a headed pin 307 which passes through suitable apertures in the bottom of the record elevating trough 301 and in the support plate 154. The lower extremity of the pin 307 rests upon one extremity of a pivoted lever 308 supported from a depending bracket structure 309. The other extremity of the lever 308 is positioned between a pair of projections 311 formed on a pivoted lever 312 which is carried by a supporting structure 313. At an intermediate point the pivoted lever 312 has a vertically arranged portion 314 which terminates at its upper end in a pointed or notched member 315. The member 315 is arranged to be engaged by a retaining spring 316 which is secured to the underside of the support plate 154. The lower extremity of the intermediate member 314 of the lever 312 is provided with a stop portion 317 which is arranged to be engaged by a cooperating stop 318 mounted on the member 276. The stop 318 is the outer extremity of an adjustably positioned lever 319 which is pivotally mounted at 321. The lever 319 is provided with a slot 322 which receives a fastening screw 323 so that the position of the stop portion 318 may be adjusted with accuracy.

The member 276 is pivotally supported at 324 in a depending supporting structure or bracket 325 secured to the underside of the support plate 154. The lever 276 is biased by a spring 326 which has one extremity connected to the underside of the support plate 154, as may be seen from Fig. 9. As is also evident from Fig. 9, the lever plate member 276 carries a pair of pins 327 which serve as limit stops to determine the position of the pick-up arm 218. The pick-up arm 218 at an intermediate point is provided with a support stud 328 which carries a boss or collar 329 which may be moved to relatively fixed adjusted position. The boss or collar 329 carries a pin 331 which extends up between the generally horizontal pins 327 of the lever plate 276.

In the position shown the elements thus far described which are to be responsive to a 10 inch phonograph record are shown in the position prior to actuation by a 10 inch record, or in the position in which they remain when the elevating trough 301 carries a 12 inch record. In the position shown the member 318 is in engagement with the stop 317 so that the outer extremity which is the cam follower roller 275 of the lever 276 is not in engagement with the cam 273 in Fig. 11.

When a 10 inch record is positioned in the elevating trough 301 the pin 307 engages the outer extremity of the lever 308 so that its other extremity raises the lever 312. This moves the depending latch member 317 out of the path of the member 318. The lever 276 therefore can move in a counterclockwise direction as seen in Fig. 11 to a greater extent so that the limiting stop pins 327 of the lever permit a greater forward movement of the cooperating pin 331 which is mounted on the member 329 secured to the pick-up arm 218.

Reference may now be had to Figs. 13 and 14 which show that the base support plate 154 carries a generally upright bracket and support stand 332 which is provided with a plurality of bosses 333 and 334 which serve as bearing members for a shaft 335. The shaft 335 at one extremity is provided with a record engaging member 336 which corresponds to the record engaging member 78 of Fig. 2. The other extremity of the shaft 335 carries a flywheel 337 which corresponds to the flywheel 81 of Fig. 2 and which is associated with a suitable record driving motor mechanism not illustrated in these figures. The flywheel 37 carries, adjacent the boss 334, a cam surface 338 which is arranged to engage a reciprocable member 339 which is mounted on another member 341. The member 341 is provided with a pair of supporting ears 342 which have apertures for receiving a pivotal support pin 343 which passes through a suitable cooperating supporting structure formed on the support member 332. The reciprocable member 337 is biased in an upward position by a spring 344 secured to the members 339 and 341. The reciprocable member 339 has at its lower extremity a transversely arranged portion 345 which passes through an aperture 346 in the support member 332. The transversely arranged projecting member 345 is positioned immediately above an electric switch 347 which carries a pair of contacts 348 which are first closed by the initial movement of the projecting member 345, and another pair of contacts 349 which are closed subsequent to the closing of the first pair of contacts 348. The reciprocable member 339 is provided with a plurality of elongated apertures 351 through which are passed headed studs or rivets 352 so as to maintain the reciprocable member 339 parallel to the supporting member 341. The supporting member 341 has a lower extremity provided with a cam follower surface 353 adapted to be engaged by a stud 354 mounted on one side of the wheel 159. When the stud 354 engages the cam follower surface 353 of the support member 341, the assembly is tilted in a counterclockwise manner so as to bring the upper extremity of the member 341 under the hook 355 of a pivoted lever member 356. The pivoted lever member 356 is pivotally secured by a pivot pin 357 to a portion of the supporting member 332. The lever 356 at one extremity is connected to the rod or wire 221 which extends through the aperture 222 of the base member 154 and terminates in a loop 219. The member 221 and the loop 219 are biased upwardly by a spring 358 connected between one extremity of the lever member 356 and a portion of the supporting member 332. The pivoted lever 356 is provided with a cam follower projection 359 which is arranged to be engaged by a cam 361 which is mounted on the shaft or rod 335. The cam 361 during each revoltuion of the flywheel 337 tends to reset the position of the lever 356 so as to maintain it in engagement with the supporting member 341. As the pick-up arm 218 moves in toward the center of the phonograph record the lever 217 which is frictionally secured to the pick-up arm 218 by a spring biased structure 220 tends to move the pivoted lever 356 in a counterclockwise direction as seen in Fig. 14, so as to disengage the hook 355 from the end of the supporting member 341. The reset cam 361, however, prevents the complete disengagement of the hook 355 from the member 341 unless the acceleration of the pick-up arm is such as to completely disengage the hook 355. This complete disengagement occurs when the pick-up arm 218 has entered the eccentric groove adjacent the center of the phonograph record.

When the acceleration of the pick-up arm has been sufficient to disengage the hook 355 from the support 341 the reciprocable member 339 carried thereby is positioned so as to be engaged by the cam surface 338. The cam surface 338 has a relatively small flattened portion 362 which permits the upper extremity of the reciprocable member 339 to be engaged by the peripheral cam surface of the cam 338 so that at the normal speed of 78 R. P. M. of the phonograph flywheel 337 the reciprocable member 339 is moved and held downwardly for nearly a second. During this time interval first the electric contacts 348 are closed and then the electric contacts 349 are closed to initiate certain operations in the sequence of operations subsequently to be described.

From Figs. 13 and 14 it will also be seen that the gear wheel 359 on the side opposite the stud 354 carries a guiding or stop member 363 which is provided with a notch for receiving the curved hook end 364 of a pivoted latch 365. The latch 365 is supported by a bracket 366 secured to the underside of the base support plate 154. The latch 365 is biased in one direction by a spring 367. The purpose of the lever 365 and the cooperating stop member 363 is for insuring the proper positioning of the countershaft 158 at the end of each revolution of the shaft. The relationship thus obtained will subsequently become apparent in connection with the description of the operation of the ratchet wheels 189 and 191 with the cooperating ratchet engaging levers 203 and 207.

By referring to Fig. 15 it will become apparent how the clutch engaging dog lever 207 serves as a clutching member for disengaging the gear 164 from driving relation with respect to the enlarged shaft portion 188 of the shaft 166. The dog lever 207 has a projecting portion 368 adapted to enter between the square teeth of the ratchet wheel 191. In the position shown in Fig. 15 it will be seen that the other extremity of the lever 207 is provided with a projecting hook portion 369 which is in engagement with the movable core member 370 of a solenoid 371. As may be seen from Fig. 9, another similar solenoid 372 is provided for cooperation with a similar lever arm 203. The solenoids 371 and 372 are energized in accordance with the preselection of the operation of the phonograph as to whether one or both sides of the phonograph record are to be played. Where only one side of the phonograph record is to be reproduced both solenoids are energized subsequent to the positioning of the phonograph record in the elevating trough 301. The solenoid 371 is energized for the reproduction of each side of the phonograph record, and hence where both sides of the record are to be reproduced the solenoid 371 is energized twice as often as the solenoid 372.

As may be seen from Fig. 9, an electric switch 373 is provided for controlling the power to the entire phonograph, including the amplifier, as well as the circuit shown in Fig. 16. Another electric switch 374 is provided to serve as a start and reject switch to control the cycling operation of the mechanism shown in Figs. 9 and 10. The record magazine adjacent the formemost edge is provided with an electric switch 375 which is a normally open circuit switch held in closed circuit position by phonograph records in the magazine. When the last record has been discharged from the magazine, this switch is opened so as to prepare a circuit for subsequently stopping the cycling operation of the mechanism.

Referring more particularly to Fig. 16, there is shown an electric circuit which controls the cycling operation. The electric switch 373 is not shown in Fig. 16 since it is connected in the electric circuit beyond the plug receptacle 401 which has four contacts. Two of the contacts 402 and 403 supply alternating current power to the circuit of Fig. 16. Another contact 404 is connected to ground potential while the remaining contact 405 is connected to a capacitor or condensor which serves to absorb transient voltages, thereby to lengthen the life of the operating switches. The contact 403 is connected to an electric conductor 406 which leads to one contact of each of the switches 291, 375 and 374.

The switches 291 and 375 are in parallel. The switch 291 is normally closed, whereas the switch 375 is normally open. The switch 291 is opened once for each revolution of the shaft 196 of Figs. 9 and 10. The switch 375 is the magazine switch which is responsive to the last phonograph record supplied from the magazine for reproduction.

The switch 374 is a double pole single throw switch which serves as the start and reject switch for the phonograph. One contact of this switch is connected to the conductor 406 and another contact is connected to a conductor 407 which extends to one of the solenoids 371. The switch blades of the switch 374 are connected to a conductor 408 which extends to one of the contacts of the electric switch 347 which is actuated whenever the pick-up arm enters the eccentric groove of a phonograph record.

One of the contacts of each of the switches 291 and 374 is connected to a conductor 409 which is connected to the upper contact of the pair of contacts 348 of the electric switch 347. The conductor 409 is also connected to one contact of the normally closed circuit switch 293 which is arranged to be opened by the stud 295 on the gear 164. The other contact of the switch 293 is connected to a conductor 411 which leads to the lower contact of the pair of contacts 349 of the switch 347. The same contact of the switch 293 is also connected to the conductor 412 which leads to the electric contact 405 of the plug 401. A capacitor 413 is connected between the conductors 407 and 409 so as to be effective across or between the upper and lower contacts of the electric switch 347. The conductor 411 is also connected to the sequence operation or cycle motor 177. One terminal of each of the solenoids 371 and 372, together with one terminal of the cycle motor 177, is connected to the conductor 414 which leads to one pole of an electric switch 379 which serves as a control for manual or automatic operation of the phonograph. The other pole of the electric switch 379 is connected to the alternating current conductor 415 which also connects to one pole of the double pole double throw reversing switch 202.

A turntable motor 381 of a reversible type is arranged to be controlled by the double pole double throw switch 202. The motor 381 is associated with a capacitor 382 which is connected to one of the switch blades 416 of the switch 202. The other switch blade 417 of the switch 202 is connected to the same point in the windings of the motor 381 as is the capacitor 382. While a particular circuit has been shown for the turntable motor in order to illustrate the circuit diagram, it is to be understood that any other type of reversible alternating curent motor may be employed.

The solenoid 372 which has one terminal connected to the conductor 414 is arranged to be energized upon the closing of either of two switches 265 or 382. The switch 382 is a switch mounted upon the tone arm rod or support shaft 258 which closes its contacts when the tone arm is moved to a certain side of the phonograph record. When it is desired to play only one side of the phonograph record, the switch 265 is actuated by the toggle lever 264, as previously described in connection with Fig. 9.

It may now be assumed that it is desired to start operation of the phonograph. A plurality of phonograph records is positioned in the magazine, thereby closing the switch 375 so as to complete an electric circuit to the reversible turntable motor 381. The manual automatic single pole single throw switch 379 is moved to the automatic position, thus closing the contacts of the switch. Thereafter the main alternating current line switch is closed so that the turntable motor 381 immediately begins to operate. The start-reject switch 374 is momentarily depressed so as to complete a circuit through the conductors 406 and 408 to the sequence operations or cycle motor 177 which in turn is connected through conductor 414 and switch 379 to the other alternating current conductor 415. At the same time the closing of the switch 374 completes the circuit from the alternating current conductor 406 to conductor 407 which is connected to the solenoid 371. The solenoid 371 is connected to conductor 414 which is connected through switch 379 to the other alternating current conductor 415. Thus the solenoid 371 is energized and the sequence operations motor 177 moves the cam shaft so that the switch 293 is permitted to close. Thus the sequence operations motor 177 is locked into circuit.

The continued operation of the motor 177 causes the phonograph record to be discharged from the magazine and moved to the record elevating means. The record is positioned on the record driving apparatus and the pick-up arm is moved into position for reproducing one side of the phonograph record. When the pick-up arm has been moved into contact with the phonograph record, the switch 293 is opened by the cam, thereby stopping the motor 177. The record driving or turntable motor 381 continues to operate until the phonograph pick-up arm enters the eccentric groove of the record. When the pick-up arm enters the eccentric groove of the record, the switch 347 is closed. The contacts 348 are first closed to complete the circuit to the sequence operations motor 177, and immediately thereafter the other contacts 349 are closed to complete a circuit to the solenoid 371. This permits the cam shaft to be rotated until the switch 293 is opened. Prior to the opening of the switch 293 the switch 347 is reset and the pick-up arm is moved out and positioned for reproduction of the other side of the record.

The positioning of the pick-up arm on the other side of the phonograph record closes the switch 382, thus preparing a circuit for subsequent energization of both of the solenoids 371 and 372.

The pick-up arm reproduces the second side of the phonograph record and then enters the eccentric groove to bring about closing of the switch 347. Thereupon the contacts 348 and 349 are closed in rapid succession. The closing of the contacts 349 energizes both of the solenoids 371 and 372 so that both portions of the sequence operations cam shaft are moved by the motor 177. The switch 293 is again closed by the movement of the cam shaft and this continues until the switch 347 is reset and the switch 293 is again opened. Thereafter the foregoing described cycle of operation is repeated until the last phonograph record in the magazine has been played. When the last record has been discharged from the magazine, the switch 376 is opened, thereby rendering effective the subsequent opening of the switch 291 by the cam 289 on the cam shaft portion 196. When the switch 291 is opened the entire electric circuit of the phonograph for both the motors 177 and 391 is deenergized.

The foregoing description of the sequence of operations in the electrical circuit stops the cam shaft portion 166 and 196 in a position about ninety degrees from that shown in Fig. 10. In that position the cam 289 has moved the switch 291 to open circuit position. The cam 273 has been moved so that its upper contour surface 281 is in engagement with the roller or cam follower 283 of the clamping arm 284.

It may now be assumed that a plurality of records is positioned in the record magazine and that the start-reject switch 374 has been energized. The momentary closing of the switch 374 produces energization of the sequence operation motor 177. The first operation to be performed following the energization of the motor 177 is the movement of the cam 226 against the lever 227 to engage the foremost record in the magazine and to cause it to be moved to the runway which leads to the record elevating trough or mechanism 301 shown in Fig. 11. This was brought about by the previous energization of both of the solenoids in the previous cycle of operation. Thereafter the cam 247 engages the intermediate lever 249 which in turn strikes the lower extremity of the elevating rod 251. If the record is a 12 inch record the indexing mechanism shown and described in connection with Fig. 11 is not actuated. If a 10 inch record is positioned in the elevating trough 301 the mechanism is indexed for positioning the tone arm accordingly. Just shortly before the cam 247 has reached its maximum height the cam follower 283 of the clamping arm 284 begins to move down toward the next contour 282. As the cam 247 lowers the rod 251 at the trough 301 the arm 284 moves inwardly so that the spindle carried thereby seeks to engage the hole phonograph record. The cam follower 283 thereafter passes down to the dwell surface 279 so that the spring 288 causes the arm 284 to firmly engage the record in driving relation with respect to the driving mechanism which includes the flywheel 331. At about the time that the arm 284 moves inwardly the cam 273 has been rotated sufficiently so as to cause the arm 276 to move downwardly, thereby to begin to move the pick-up arm 218 inwardly toward the outer groove of the record. After the pick-up arm 218 has been positioned in the proximity of the outer groove of a phonograph record, the cam 255 comes into engagement with the pivoted cam 256. While the arm 276 was moving the pick-up arm 218 inwardly, the pick-up arm was biased to neutral position by the spring 271 so that the braking surfaces corresponding to the surfaces 136 and 137 of the pick-up illustrated in Fig. 6 are in engagement with each other. The engagement of the cam 255 with the pivoted cam member 256 tilts the pick-up arm 218 so as to disengage the braking surfaces associated with the pick-up arm and permit the arm to have the necessary freedom to follow the groove on the phonograph record even though the record may be slightly warped. During the reproduction of the phonograph record the cam 255 is in contact with the pivoted cam member 256 so that the braking surfaces of the pick-up arm are disengaged. As soon as the record has been reproduced and the switch 347 actuated, the cam 255 clears the cam member 256 so as to cause the braking surfaces of the pick-up arm to be returned into engagement with each other. Thus subsequently the pick-up arm may be moved outwardly in accordance with the type of operation previously described in conformance with the construction illustrated in Fig. 6.

The cam shafts continue to rotate until the projection 295 on the gear wheel 164 actuates the switch 293. This interrupts the circuit to the sequence operation motor 177 and the pick-up arm reproduces the phonograph record. The position of the cam shafts is that illustrated in Fig. 10. When one side of the record has been reproduced the arm 217 associated with the pick-up arm 218 is effective to lower the loop 219 to disengage the catch 335 from the support member 341. This causes the reciprocable member 339 to be positioned for engagement by the cam 338 carried by the flywheel 337. The transversely extending portion 345 of the reciprocable member 339 actuates the switch 347. This reenergizes the sequence operations motor 177 and, where both sides of the phonograph record are to be reproduced, produces energization of only the solenoid 371. This then permits the gear wheel 164 to rotate and drive the countershaft 159, which in turn, through the gears 161 and 254, rotates the cam 273 and the cam 255. The cam 255 engages the pivoted cam 256 so as to shift the pick-up arm into position for reproducing the other side of the phonograph record. Rotation of the countershaft 159 causes the stud 212 on the arm 213 to actuate the toggle 201 of the switch 202, thereby to reverse the direction of rotation of the turntable motor 391. At about the time that the switch 202 is being actuated, the stud or cam surface 354 mounted on the gear wheel 159 engages the cam follower surface 354 of the pivoted support 341 so that it is again moved into engagement with the hook 355 of the lever 356. Thus the switch 347 has been reset for subsequent operation. The cam 273 on the shaft 196 is in position so as to actuate the arm 276 which indexes the pick-up arm 218. This therefore moves the pick-up arm outwardly away from the phonograph record. The shaft 158 continues to rotate so that the stud 215 comes into engagement with the lever 217 to again reset that lever, since it is frictionally associated with the pick-up arm 218. Thereafter the cam 273 causes the pick-up arm 218 to be moved inwardly the proper distance to position the stylus of the pick-up in the outer groove of the phonograph record. The shaft 158 continues to rotate until the projection 295 on the gear 164 opens the switch 293. The sequence operations mechanism is therefore stopped during the reproduction of the other side of the phonograph record.

Upon reproduction of the other side of the phonograph record, the arm 217 responds to the eccentric groove of the record, and again actuates the rod 221 to move the pivoted lever 356 so as to disengage the catch 355 from the support member 341. Thus the switch 347 is actuated. The actuation of the switch 347 energizes the sequence operation motor 177 and both of the solenoids 371 and 372, since the positioning of the pick-up arm 218 brought about the closing of the switch 382 which is mounted on the shaft 258. This causes all of the shafts 158 and 196 to be rotated. The cam 255 again engages the pivoted cam member 256 so as to tilt the pick-up arm 218 back to its previous position for reproduction of the first side of a subsequent phonograph record. The cam 266 comes into engagement with the pivoted lever 271 to cause another phonograph record to be elevated in the magazine ready for discharge toward the elevating trough 301. At this same time the cam follower 283 of the arm 284 begins to move up to the surface 281, thus carrying the reproduced phonograph record on its spindle so that when it reaches the stripping member 380 which corresponds to the member 49 in Fig. 1 the record is dropped into the record return trough 370 which leads to the discard magazine associated with the reset member 242. The cam 226 is so positioned that at about the time that the reproduced record enters the trough 370 a new record from the magazine is permitted to roll into the record elevating trough 301. The record trough 370 is for twelve inch records and the trough 390 is for ten inch records so as to minimize shocks. Thereafter the disk 197 moves its projecting member 199 into engagement with a toggle 201 of the turntable reversing switch 202. The cam 245 now engages the reset member 246 which resets the indexing mechanism shown in Fig. 11. If the record now supplied to the trough 301 is of smaller diameter than the previous record, the mechanism shown and described in connection with Fig. 11 is actuated so as to control the distance through which the arm 276 may move, thus permitting the pick-up arm 218 to be moved inwardly sufficiently to engage the outer groove of the smaller or 10 inch phonograph record.

Further rotation of the sequence operation mechanism brings the cam 247 into operation so as to elevate the trough 301, and as the trough is reaching its maximum height or elevation the arm 284 begins to move inwardly toward the record. The operations thereupon following are similar to those initially described in that the arm 284 moves into clamping engagement with the record and the elevating member 301 returns to its lowermost position. The cam 273 permits the tone arm to move inwardly into contact with the record. The gear wheel 164 rotates until the switch 293 is actuated to stop the motor 177.

The foregoing cycle of operations is continued until both sides of the last phonograph record in the magazine have been reproduced. When the last record has been reproduced, the switch 347 is actuated to energize the cycle or sequence operation motor 177. Both solenoids 371 and 372 are energized so that all portions of the sequence operation mechanism move together. This causes the cam 282 to move the arm 284 outwardly to strip the last record therefrom and to reverse the direction of the turntable motor 381. Rotation of the shaft 196 continues until the switch 291 is actuated by the cam 289, thereby to open the contacts of that switch and stop further operation of the phonograph.

In order to illustrate still further the relationship of the various components comprising the sequence operation mechanism, the following table of actions given in degrees for each operation of the 360 degree cycle of rotation of the shaft 196 is believed to be helpful:

|  | Degrees |
| --- | --- |
| Record tripped, tone arm needle off record and tone arm started out | 15 |
| Record clamp starts to open | 23 |
| Tone arm out and clear of record | 69 |
| Record clamp out and played record discharged to storage magazine | 102 |
| New record released to raising saddle and starts to raise into clamping position | 177 |
| Record clamp starts to close and moves to rest position | 208 |
| New record raised and lowered to clamping position on centering pin and clamp starts to close | 270 |
| Record clamp closed | 300 |
| Tone arm in | 318 |
| Tone arm on the record in play position | 354 |
| Tone arm brake released | 360 |

Where it is desired to reproduce only one side of each record in the magazine, the toggle lever 264 is actuated, thereby closing the switch 265. Thus when the first side of the phonograph record has been reproduced, both solenoids 371 and 372 will be energized, thus eliminating in the foregoing description that portion of the operation where the shaft 158 made one revolution while the shaft 196 remained stationary. The movement of the pivoted lever 264 also brings the resilient finger 261 on the collar 262 into engagement with the projecting finger 259 of the pivoted cam 256. Thus the cam 255 engages one side of the pivoted cam member 256 and tends to shift the cam member to the opposite position, but the resilient spring member or finger 261 returns the cam 256 to its former position as soon as the cam 255 moves beyond and out of engagement with the pivoted cam 256. Thus the pick-up arm 218 remains tilted in one direction so as always to engage the one side of each phonograph record.

If it is desired to reproduce records by the manual method the switch 379 is kept in open circuit position. An individual record is placed in the elevating trough 301 so as to properly index the mechanism for moving the pick-up arm 218. Thereafter the switches 379 and 374 act to cause the sequence operation mechanism to go through a single cycle of operation such as previously described. At the end of the reproduction of a phonograph record the mechanism stops because the switch 375 never has been closed and the switch 291 is opened by the cam shaft 196. Thus it will be appreciated that a plurality of different modes of operation may be selected. Due to the indexing mechanism provided in conjunction with the elevating trough 301, records of different sizes may be intermixed. If desired only one side of the phonograph record or the entire stack of records in the magazine may be reproduced. If desired, both sides of each record may be reproduced.

In connection with the first embodiment illustrated in Figs. 1 to 8, there is shown a mechanical arrangement for bringing about the rotation of two portions of the sequence operation cam mechanism. In that embodiment one portion was mounted on a sleeve and the other portion was mounted on a shaft. In the latter embodiment just described, one portion of the sequence operation cam mechanism was mounted on a shaft and the remaining portions of the mechanism were mounted on a countershaft and on a sleeve on the first shaft. Electromagnetic means were employed to control the relative rotation of both portions of the sequence operation mechanism, both devices having common selectively operable means for determining whether both portions of the sequence operation mechanism are to be rotated together as is the case where a single side of each record is to be reproduced, or whether sequential operation of the two portions of the sequence operation mechanism is to occur, as is the case where both sides of each phonograph record are to be reproduced. In each case an indexing mechanism is also provided for determining the positioning of the pick-up arm in accordance with different diameter phonograph records. This mechanism is responsive to the smaller diameter record which is supported on spaced-apart support members associated with the means for elevating the record into position for engagement by the record driving means.

While for the purpose of illustrating and describing the invention certain embodiments have been shown in the drawings, it is to be understood that the invention is not to be limited thereby since such variations in the instrumentalities employed and in their arrangement are contemplated as may be commensurate with the scope of the invention as defined in the following claims.

Having thus described our invention, we claim:

1. In an automatic phonograph, a rotatable record support for supporting a phonograph record for reproduction on both sides, a dual pick-up arm pivotally mounted for playing engagement with either side of said record, a sequence operation mechanism formed in a plurality of cam portions interconnected by a selectively operable clutch and operatively associated with said supporting means and said pick-up arm for selectively pivoting said pick-up arm to play one or both sides of said record, means for selectively predetermining the playing of one side or both sides of a phonograph record, and means responsive to said latter means for operating said clutch.

2. In an automatic phonograph, a rotatable record support for supporting a phonograph record for reproduction on both sides, a dual pick-up arm pivotally mounted for playing engagement with either side of said record, a sequence operations shaft formed of a plurality of cam portions and operatively associated with said supporting means and said pick-up arm for selectively pivoting said pick-up arm to play one or both sides of said record, a motor for driving said shaft, and electromagnetically controlled clutching means for selectively interconnecting portions of said shaft in driving relation with said driving means.

3. In an automatic phonograph, a rotatable record support for reproducing a phonograph record on both sides including a dual pick-up arm pivotally mounted for playing engagement with either side of said record, a sequence operations mechanism including a driving motor connected to a plurality of ratchet wheels, a plurality of sequence operations cam members operatively associated with said pickup arm and arranged to be selectively interconnected with said ratchets, and a plurality of electromagnetic devices for interconnecting said ratchets in driving relation with said cam members.

4. In an automatic phonograph, means for vertically rotating and reproducing phonograph records of different diameters including a pick-up arm normally indexed for reproducing the larger diameter records, means for elevating a record to said rotating means including a vertically reciprocable trough engaging in supporting relation spaced-apart points on the periphery of a record, and means located between said spaced-apart points of said trough so as to be contacted only by the smaller diameter record for indexing said pick-up arm.

5. In an automatic phonograph for reproducing records of different diameters, means for rotating a phonograph record, a pick-up arm for reproducing a record, means for supplying a record to said rotating means including a member having spaced-apart support points for engaging the periphery of a record, means located between said spaced-apart points so as to be contacted only by the smaller diameter record positioned thereon, and means responsive to said latter means for positioning said pick-up arm in accordance with the diameter of the phonograph record.

6. The combination in an automatic phonograph for reproducing different diameter records including means for vertically rotating a record, means for elevating a record for rotation by said first means including a reciprocable member having spaced-apart supports for engaging the periphery of a record, a pick-up arm normally arranged to be moved into position for reproducing a larger diameter record, and means located between said spaced-apart points so as to be contacted only by the smaller diameter phonograph record for accordingly modifying the position of said pick-up arm.

7. An automatic phonograph having means for reproducing a record in a vertical position, a record magazine for records to be played, a record discharge magazine for played records, record transferring means for moving records to and from said magazines and to and from said reproducing means, horizontally shiftable trough-like means for supporting discarded records in substantially vertical position comprising a bottom support and a tilted back support, and means actuated concomitantly with said record transferring means to shift said supporting means a predetermined amount thereby to receive a discarded record.

8. The combination in an automatic phonograph for playing one or both sides of each record comprising reversible means for vertically rotating a record, a dual pickup arm pivotally mounted for biaxial movement into and out of playing relation with each side of said record, means for moving a record to and from said rotating means, a sequence operation mechanism including a cam shaft formed in two portions, a first portion of said shaft being operatively associated with said record moving means for cyclically actuating said record moving means, a second portion of said shaft being operatively associated with said pickup arm and said record rotating means for cyclically imparting said biaxial movement to said pickup arm and controlling direction of rotation of said record rotating means in timed relation to actuation of said record moving means and said pickup arm, and means for selectively rotating said first cam shaft portion or both of said cam shaft portions for playing a record on one side or on both sides.

9. The combination in an automatic phonograph for playing one or both sides of each record comprising reversible means for vertically rotating a record, a dual pickup arm pivotally mounted for biaxial movement into and out of playing relation with each side of said record, means for moving a record to and from said rotating means, a sequence operation mechanism including a cam shaft formed in two portions, a first portion of said shaft being operatively associated with said record moving means for cyclically actuating said record moving means, a second portion of said shaft being operatively associated with said pickup arm and said record rotating means for cyclically imparting said biaxial movement to said pickup arm and controlling direction of rotation of said record rotating means in timed relation to actuation of said record moving means and said pickup arm, and a two-position manually operable means operatively associated with the first and second portions of said shafts when in one position for effecting simultaneous rotation thereof to play a record on one side only and when in the other position for effecting rotation thereof first sequentially and then simultaneously to play a record on both sides.

FRANK FREIMANN.
CARL HART.
ARTHUR L. KNOX, SR.

References Cited in the file of this patent

UNITED STATES PATENTS

| Number | Name | Date |
|---|---|---|
| 1,377,027 | Pettit | May 3, 1921 |
| 1,474,776 | Hunt | Nov. 20, 1923 |
| 1,508,572 | Ord | Sept. 16, 1924 |
| 1,868,846 | Oyston | July 26, 1932 |
| 1,955,534 | Collison | Apr. 17, 1934 |
| 1,968,245 | Bussoz | July 31, 1934 |
| 2,007,054 | Jones et al. | July 2, 1935 |
| 2,043,789 | Ansley | June 9, 1936 |
| 2,104,032 | Green | Jan. 4, 1938 |
| 2,129,611 | White | Sept. 6, 1938 |
| 2,137,276 | Erbe | Nov. 22, 1938 |
| 2,238,612 | Tsuchiya | Apr. 15, 1941 |
| 2,281,547 | Andrews | May 5, 1942 |
| 2,287,098 | Habegger | June 23, 1942 |
| 2,295,460 | Farrow | Sept. 8, 1942 |
| 2,309,352 | Offen | Jan. 26, 1943 |
| 2,323,365 | Andrews | July 6, 1943 |
| 2,340,418 | Gabel | Feb. 1, 1944 |
| 2,348,766 | Wagner et al. | May 16, 1944 |
| 2,352,561 | Offen | June 27, 1944 |
| 2,370,875 | Pressley | Mar. 6, 1945 |
| 2,373,494 | Noren et al. | Apr. 10, 1945 |
| 2,426,978 | Alexandersson | Sept. 9, 1947 |
| 2,436,529 | Pressley | Feb. 24, 1948 |

FOREIGN PATENTS

| Number | Country | Date |
|---|---|---|
| 490,551 | Great Britain | Aug. 16, 1938 |
| 498,442 | Great Britain | Jan. 9, 1939 |